United States Patent
Motomura et al.

(10) Patent No.: US 9,513,036 B2
(45) Date of Patent: Dec. 6, 2016

(54) AIR-CONDITIONING APPARATUS

(75) Inventors: Yuji Motomura, Tokyo (JP); Osamu Morimoto, Tokyo (JP); Daisuke Shimamoto, Tokyo (JP); Kouji Azuma, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 305 days.

(21) Appl. No.: 14/114,775

(22) PCT Filed: Jun. 16, 2011

(86) PCT No.: PCT/JP2011/003448
§ 371 (c)(1),
(2), (4) Date: Oct. 30, 2013

(87) PCT Pub. No.: WO2012/172613
PCT Pub. Date: Dec. 20, 2012

(65) Prior Publication Data
US 2014/0137589 A1 May 22, 2014

(51) Int. Cl.
*F25B 13/00* (2006.01)
*F25B 29/00* (2006.01)
(Continued)

(52) U.S. Cl.
CPC ............ *F25B 29/003* (2013.01); *F24F 3/065* (2013.01); *F24F 5/0017* (2013.01); *F25B 7/00* (2013.01);
(Continued)

(58) Field of Classification Search
CPC .......... F25B 41/00; F25B 7/00; F25B 13/00; F25B 29/003; F25B 25/005; F25B 2313/07232; F25B 2313/021; F25B 2400/24; F25B 2321/0211–2321/0215; F25B 2600/2501
USPC .......... 62/118, 99, 98, 324.6, 430, 185, 203, 62/324.2, 335, 259.2, 529
See application file for complete search history.

(56) References Cited

U.S. PATENT DOCUMENTS 2,227,244 A * 12/1940 Candor ................. F25D 11/006
62/133
4,646,539 A * 3/1987 Taylor .................. F25B 47/022
62/196.4
(Continued)

FOREIGN PATENT DOCUMENTS

EP 2 314 939 A1 4/2011
JP 05-196267 A 8/1993
(Continued)

OTHER PUBLICATIONS

Office Action mailed Dec. 9, 2014 issued in corresponding JP patent application No. 2013-520326 (and English translation).
(Continued)

*Primary Examiner* — Marc Norman
*Assistant Examiner* — David Teitelbaum
(74) *Attorney, Agent, or Firm* — Posz Law Group, PLC

(57) ABSTRACT

An air-conditioning apparatus includes a refrigerant circuit including a compressor, a first refrigerant flow switching device, a plurality of intermediate heat exchangers, a first expansion device, and a heat-source-side heat exchanger, through all of which a refrigerant circulates and all of which in combination form a refrigeration cycle; and a heat medium circuit including the plurality of intermediate heat exchangers, a pump, and a plurality of use-side heat exchangers, through all of which a heat medium circulates. The air-conditioning apparatus further includes a heat medium energy storage that is connected to the heat medium circuit and stores the heat medium; and an intra-storage heat exchanger that is connected to the refrigerant circuit and heats or cools the heat medium in the heat medium energy storage by using the heat-source-side refrigerant supplied thereto.

10 Claims, 10 Drawing Sheets

(51) Int. Cl.
*F25B 41/00* (2006.01)
*F25B 7/00* (2006.01)
*F25B 25/00* (2006.01)
*F24F 3/06* (2006.01)
*F24F 5/00* (2006.01)

(52) U.S. Cl.
CPC ............. *F25B 13/00* (2013.01); *F25B 25/005* (2013.01); *F25B 41/00* (2013.01); *F25B 2313/023* (2013.01); *F25B 2313/0211* (2013.01); *F25B 2313/0212* (2013.01); *F25B 2313/0213* (2013.01); *F25B 2313/0214* (2013.01); *F25B 2313/0215* (2013.01); *F25B 2313/0272* (2013.01); *F25B 2313/02732* (2013.01); *F25B 2313/02741* (2013.01); *F25B 2321/021* (2013.01); *F25B 2400/24* (2013.01); *F25B 2600/2501* (2013.01); *Y02E 60/147* (2013.01)

(56) References Cited

U.S. PATENT DOCUMENTS

| | | | | |
|---|---|---|---|---|
| 5,381,671 A | * | 1/1995 | Saito | F24F 3/065 62/430 |
| 6,119,478 A | * | 9/2000 | Sada | F25B 13/00 62/434 |
| 2001/0047662 A1 | * | 12/2001 | Takao | C09K 5/066 62/430 |
| 2010/0252232 A1 | * | 10/2010 | Reich | F28D 20/0034 165/48.1 |

FOREIGN PATENT DOCUMENTS

| | | |
|---|---|---|
| JP | 05-280818 A | 10/1993 |
| JP | 08-028932 A | 2/1996 |
| JP | 08-247508 A | 9/1996 |
| JP | 2001-289465 A | 10/2001 |
| JP | 2002-156145 A | 5/2002 |
| JP | 2003-343936 A | 12/2003 |
| JP | 2005-140444 A | 6/2005 |
| WO | 2010/049998 A1 | 5/2010 |
| WO | 2011/052042 A1 | 5/2011 |

OTHER PUBLICATIONS

Extended European Search Report dated Jan. 21, 2015 issued in corresponding EP patent application No. 11867608.9.
International Search Report of the International Searching Authority mailed Sep. 20, 2011 for the corresponding international application No. PCT/JP2011/003448 (with English translation).
Office Action dated Aug. 3, 2015 issued in corresponding CN patent application No. 201180071153.X (and English translation).

* cited by examiner

F I G. 1
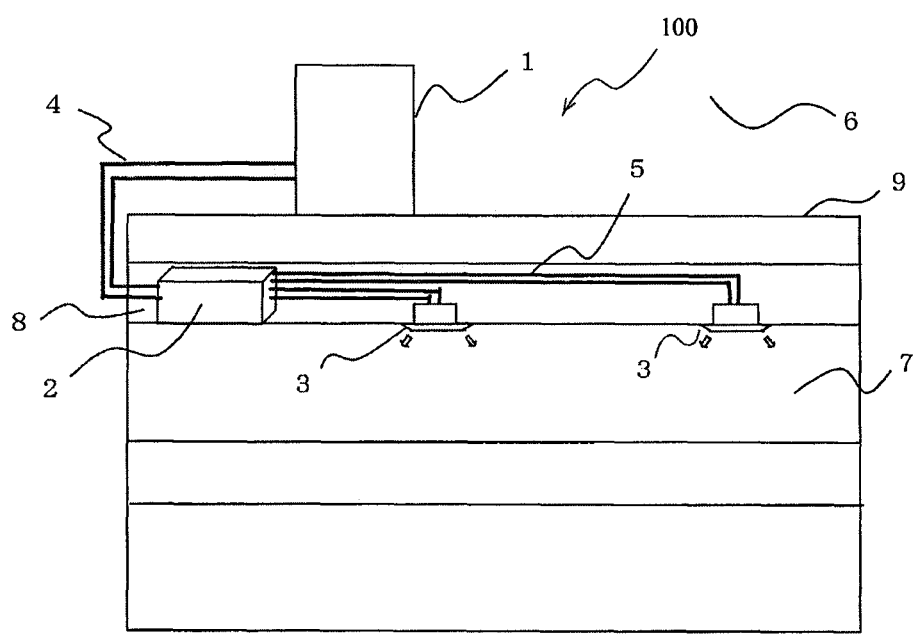

AIR-CONDITIONING APPARATUS

CROSS REFERENCE TO RELATED APPLICATION

This application is a U.S. national stage application of PCT/JP2011/003448 filed on Jun. 16, 2011, the disclosure of which is incorporated by reference.

TECHNICAL FIELD

The present invention relates to an air-conditioning apparatus applicable to, for example, a multi-air-conditioning apparatus intended for an office building, and the like.

BACKGROUND

In some air-conditioning apparatuses such as a multi-air-conditioning apparatus intended for an office building, a heat source unit (an outdoor unit) is provided on the outside of a building, and indoor units are provided on the inside of the building. In such an air-conditioning apparatus, a refrigerant that circulates through a refrigerant circuit transfers its heat to (or receive heat from) air that is supplied to a heat exchanger included in each of the indoor units, whereby the air is heated or cooled. Furthermore, the heated or cooled air is sent into an air-conditioned space, whereby the air-conditioned space is heated or cooled.

In many cases, a HFC (hydrofluorocarbon)-based refrigerant, for example, is employed as the heat-source-side refrigerant to be used in the above air-conditioning apparatus. In some other proposals, a natural refrigerant such as carbon dioxide ($CO_2$) is employed as the heat-source-side refrigerant.

Other types of air-conditioning apparatuses called chillers have also been proposed in each of which a heat source unit provided on the outside of a building generates cooling energy or heating energy (see Patent Literature 1, for example). In the technology disclosed by Patent Literature 1, water, antifreeze, or the like is heated or cooled by a heat exchanger provided in an outdoor unit and is then transported to indoor units such as fan coil units or panel heaters, whereby heating or cooling is performed.

Another air-conditioning apparatus called heat-recovery chiller has been proposed in which a heat source unit and each of indoor units are connected to each other by four water pipes (see Patent Literature 2, for example). In the technology disclosed by Patent Literature 2, heated or cooled water or the like is simultaneously supplied to the indoor units, so that cooling or heating is freely selectable on the indoor units.

Yet another air-conditioning apparatus has been proposed in which a heat exchanger that exchanges heat between a primary refrigerant and a secondary refrigerant is provided near each of indoor units (see Patent Literature 3, for example).

Yet another air-conditioning apparatus has been proposed in which a heat-source-side refrigerant that has been heated or cooled by an outdoor unit is supplied to heat exchangers provided in branch units, and heating energy or cooling energy of the heat-source-side refrigerant is transferred to a heat medium via the heat exchangers (see Patent Literature 4, for example). In the technology disclosed by Patent Literature 4, the outdoor unit and each of the branch units are connected to each other by two pipes.

Yet another air-conditioning apparatus such as a multi-air-conditioning apparatus intended for an office building has been proposed in which a refrigerant is made to circulate between an outdoor unit and a relay unit while a heat medium such as water is made to circulate between the relay unit and each of indoor units, whereby the power for transporting the heat medium is reduced while the heat medium such as water is made to flow through the indoor units (see Patent Literature 5, for example).

PATENT LITERATURE

Patent Literature 1: Japanese Unexamined Patent Application Publication No. 2005-140444 (p. 4 and FIG. 1, for example)

Patent Literature 2: Japanese Unexamined Patent Application Publication No. 5-280818 (pp. 4 and 5 and FIG. 1, for example)

Patent Literature 3: Japanese Unexamined Patent Application Publication No. 2001-289465 (pp. 5 to 8 and FIGS. 1 and 2, for example)

Patent Literature 4: Japanese Unexamined Patent Application Publication No. 2003-343936 (p. 5 and FIG. 1, for example)

Patent Literature 5: WO10/049998 (p. 3 and FIG. 1, for example)

In each of the technologies disclosed by Patent Literature 1 to 5, in restarting an air-conditioning operation that has been stopped temporarily or in switching the operation between a heating operation and a cooling operation, the heat medium needs to be heated or cooled by the heat-source-side refrigerant before being transported toward the indoor units. Furthermore, in each of the technologies disclosed by Patent Literature 1 to 5, the heat medium also needs to be heated by the heat-source-side refrigerant before being transported toward the indoor units in a freezing easing mode in which freezing of the heat medium in heat medium pipes is suppressed by utilizing the heat of a high-temperature refrigerant that has been discharged from a compressor.

As described above, to heat or cool a use-side heat exchanger to a predetermined temperature, time to do work for heating or cooling the heat medium to a predetermined temperature needs to be provided.

How long it takes to heat or cool the heat medium to a predetermined temperature depends on the total volume of heat medium. Therefore, if the total volume of heat medium is large as in a multi-air-conditioning apparatus intended for an office building, it takes long to heat or cool the heat medium to a predetermined temperature.

That is, in each of the technologies disclosed by Patent Literature 1 to 5, it takes long to restart the cooling operation or the heating operation, to switch the operation between the heating operation and the cooling operation, and to execute an operation in the freezing easing mode.

In each of the technologies disclosed by Patent Literature 1 and 2, the heat medium is heated or cooled in the heat source unit provided on the outside of the building, and the heat medium is then transported toward the indoor units. That is, the heat source unit and the indoor units are connected to each other by heat medium pipes. Correspondingly, the path of circulation is long. Compared with the case of the heat-source-side refrigerant, in the case of the heat medium, a large amount of energy is consumed as, for example, the power for transporting heat required for performing predetermined heating or cooling work. Hence, in each of the technologies disclosed by Patent Literature 1 and 2, the power for the transportation is very high because the path of circulation of the heat medium is long.

In the technology disclosed by Patent Literature 2, a plurality of indoor units is provided. To make the operation selectable from cooling and heating on each of the indoor units, the outdoor side and the indoor side are connected to each other by four pipes. In the technology disclosed by Patent Literature 4, the branch units are each connected to a total of four extension pipes, including two for cooling and two for heating. As a result, the apparatus has a configuration that is similar to a system in which an outdoor unit and each branch unit are connected to each other by four pipes.

As described above, in each of the technologies disclosed by Patent Literature 2 and 4, four pipes are necessary to connect the outdoor side and the indoor side, leading to troublesome construction work.

In the technology disclosed by Patent Literature 3, a pump for transporting the heat medium is provided for each of the indoor units. Hence, the technology disclosed by Patent Literature 3 is impractical not only because the system costs high in correspondence with the number of pumps but also because noise increases.

In addition, since the heat exchanger through which the refrigerant flows is provided near each of the indoor units, the refrigerant may leak in or near rooms.

In the technology disclosed in Patent Literature 4, the primary refrigerant obtained after heat exchange and the primary refrigerant obtained before heat exchange flow into the same passage. Therefore, in a case where a plurality of indoor units is provided, the maximum performance is not exerted in each of the indoor units, resulting in a waste of energy.

The technology disclosed by Patent Literature 5 has no problem in a case where a single-component refrigerant or a near-azeotropic refrigerant is used as the refrigerant. In a case, however, where a zeotropic refrigerant mixture is used as the refrigerant, when a refrigerant-and-heat-medium heat exchanger is used as an evaporator, the heat medium such as water may be frozen because of a temperature glide between the saturated liquid temperature and the saturated gas temperature of the refrigerant. Hence, in such an air-conditioning apparatus, it is understood that energy can be saved if the temperature of the heat medium that is in circulation is controlled well.

SUMMARY

The present invention is to solve at least one of the above problems and to provide an air-conditioning apparatus in which the time taken for at least one of restart of an air-conditioning operation that has been stopped temporarily, switching of the operation between a heating operation and a cooling operation, and execution of an operation in a freezing easing mode is reduced.

An air-conditioning apparatus according to the present invention includes a refrigerant circuit including a compressor, a first refrigerant flow switching device, a plurality of intermediate heat exchangers, a first expansion device, and a heat-source-side heat exchanger, through all of which a refrigerant circulates and all of which in combination form a refrigeration cycle; and a heat medium circuit including the plurality of intermediate heat exchangers, a pump, and a plurality of use-side heat exchangers, through all of which a heat medium circulates. The air-conditioning apparatus further includes a heat medium energy storage that is connected to the heat medium circuit and stores the heat medium; and an intra-storage heat exchanger that is connected to the refrigerant circuit and heats or cools the heat medium in the heat medium energy storage by using the heat-source-side refrigerant supplied thereto. The heat medium that is heated in the heat medium energy storage and is stored with heating energy in the heat medium energy storage is transported to any of the use-side heat exchangers that have been requested to perform heating operations, or the heat medium that is cooled in the heat medium energy storage and is stored with cooling energy in the heat medium energy storage is transported to any of the use-side heat exchangers that have been requested to perform cooling operations.

In the air-conditioning apparatus according to the present invention, the heat-source-side refrigerant is supplied to the intra-storage heat exchanger, and the heat medium in the heat medium energy storage is stored with heating energy or cooling energy. Furthermore, in the air-conditioning apparatus, prior to restart of an air-conditioning operation, the heat medium that is stored with heating energy or cooling energy is transported to the use-side heat exchangers. Therefore, the time taken for at least one of restart of an air-conditioning operation, switching of the operation between the heating operation and the cooling operation, and execution of an operation in a freezing easing mode is reduced.

BRIEF DESCRIPTION OF DRAWINGS

FIG. 1 is a schematic diagram illustrating an exemplary installation of an air-conditioning apparatus according to Embodiment of the present invention.

DETAILED DESCRIPTION

Figure 2:
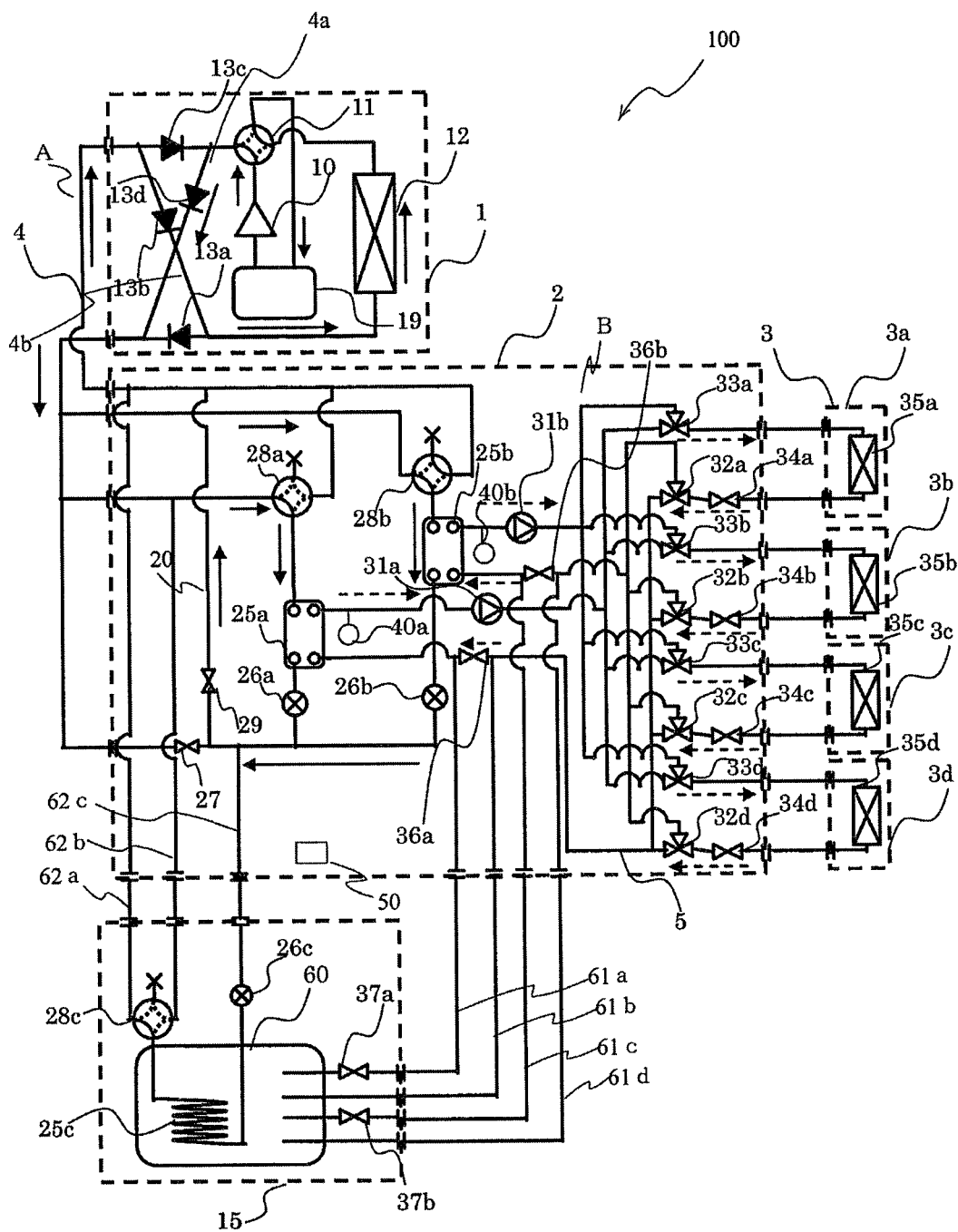
FIG. 2 illustrates an exemplary refrigerant circuit configuration of the air-conditioning apparatus according to Embodiment of the present invention.

Embodiment of the present invention will now be described with reference to the drawings.

Embodiment

FIG. 1 is a schematic diagram illustrating an exemplary installation of an air-conditioning apparatus 100 according to Embodiment.

In the air-conditioning apparatus 100 according to Embodiment, when the temperatures of any indoor spaces reach respective preset temperatures, the supply of a heat medium to use-side heat exchangers 35 provided in corresponding ones of indoor units 3 is stopped (corresponding ones of thermostats are turned off). Furthermore, in the air-conditioning apparatus 100, if an instruction is given by a user, not only the supply of the heat medium to the use-side heat exchanger 35 provided in a corresponding one of the indoor units 3 but also the operation of a fan provided to that use-side heat exchanger 35 is stopped (a stop mode) even if the temperature of a corresponding one of the indoor spaces has not reached the preset temperature. Thus, when the temperatures of any indoor spaces reach the preset temperatures, the air-conditioning apparatus 100 according to Embodiment turns corresponding ones of the thermostats off so as to adjust the temperatures of the indoor spaces. Furthermore, when the air-conditioning apparatus 100 receives an instruction to stop the operation from a user, the air-conditioning apparatus 100 executes an operation in the stop mode.

The air-conditioning apparatus 100 has a function of reducing the start-up time taken for restarting an air-conditioning operation (a heating operation, a cooling operation, or the like) from a state where any thermostats are off or from the stop mode.

The air-conditioning apparatus 100 includes a refrigerant circuit A as a refrigeration cycle through which a heat-source-side refrigerant circulates, and a heat medium circuit B through which the heat medium circulates. The operation is selectable from the cooling operation and the heating operation on each of the indoor units 3. Herein, a mode in which all the indoor units 3 perform the cooling operation is referred to as cooling only operation mode, a mode in which all the indoor units 3 perform the heating operation is referred to as heating only operation mode, and a mode in which some indoor units 3 perform the cooling operation and other indoor units 3 perform the heating operation is referred to as cooling and heating mixed operation mode. The cooling and heating mixed operation mode includes a cooling main operation mode in which the cooling load is the larger, and a heating main operation mode in which the heating load is the larger.

As illustrated in FIG. 1, the air-conditioning apparatus 100 according to Embodiment includes an outdoor unit (heat source unit) 1, a plurality of indoor units 3, and one relay unit 2 interposed between the outdoor unit 1 and the indoor units 3. The relay unit 2 exchanges heat between the heat-source-side refrigerant and the heat medium. The outdoor unit 1 and the relay unit 2 are connected to each other by refrigerant pipes 4 through which the heat-source-side refrigerant flows. The relay unit 2 and the indoor units 3 are connected to each other by heat medium pipes 5 through which the heat medium flows. Cooling energy or heating energy generated by the outdoor unit 1 is delivered to the indoor units 3 via the relay unit 2.

The outdoor unit 1 is in general provided in an outdoor space 6, which is a space outside a building 9 such as an office building (a space on the rooftop, for example), and supplies cooling energy or heating energy to the indoor units 3 via the relay unit 2.

The relay unit 2 transfers the heating energy or the cooling energy generated by the outdoor unit 1 to the indoor units 3.

The relay unit 2 is separate from the outdoor unit 1 and the indoor units 3 so as to be installable at a position that is separate from the outdoor space 6 and indoor spaces 7. The relay unit 2 is connected to the outdoor unit 1 by the refrigerant pipes 4 and to the indoor units 3 by the heat medium pipes 5.

The indoor units 3 are provided at such positions that cooling air or heating air can be supplied to the indoor spaces 7, which are spaces inside the building 9 (rooms, for example), and supply cooling air or heating air to the indoor spaces 7, which correspond to air-conditioned spaces. While the indoor units 3 illustrated in FIG. 1 are of a ceiling concealed type, the indoor units 3 are not limited thereto.

A heat medium energy storage tank device 15 (see FIG. 2) can store the heating energy or the cooling energy generated by the outdoor unit 1. The position of the heat medium energy storage tank device 15 is not specifically limited. The heat medium energy storage tank device 15 may be provided in a space 8, for example. The heat medium energy storage tank device 15 is connected to some of the refrigerant pipes 4 included in the relay unit 2 by refrigerant pipes 62a to 62c. The heat medium energy storage tank device 15 is also connected to some of the heat medium pipes 5 included in the relay unit 2 by heat medium pipes 61a to 61d.

The heat-source-side refrigerant is transported from the outdoor unit 1 to the relay unit 2 through the refrigerant pipes 4. The heat-source-side refrigerant thus transported exchanges heat with the heat medium in intermediate heat exchangers (to be described below) provided in the relay unit 2, thereby heating or cooling the heat medium. That is, the heat medium is heated or cooled in the intermediate heat exchangers and thus turns into hot water or cold water. The hot water or the cold water obtained in the relay unit 2 is transported to the indoor units 3 through the heat medium pipes 5 by heat medium transporting devices (to be described below). In the indoor units 3, the hot water or the cold water is used for the heating operation or the cooling operation performed on the indoor spaces 7.

The heat-source-side refrigerant may be, for example, a single-component refrigerant such as R-22 or R-134a, a near-azeotropic refrigerant mixture such as R-410A or R-404A, a zeotropic refrigerant mixture such as R-407C, a refrigerant such as $CF_3$ or $CF=CH_2$ that has any double bonds in its chemical formula and that has a relatively small global warming potential or a mixture containing such a refrigerant, or a natural refrigerant such as $CO_2$ or propane.

On the other hand, the heat medium may be, for example, water, antifreeze, a mixture of water and antifreeze, or a mixture of water and a highly anticorrosive additive. The air-conditioning apparatus 100 according to Embodiment is described on the premise that water is employed as the heat medium.

As illustrated in FIG. 1, in the air-conditioning apparatus 100 according to Embodiment, the outdoor unit 1 and the relay unit 2 are connected to each other by two refrigerant pipes 4, and the relay unit 2 and each of the indoor units 3 are connected to each other by two heat medium pipes 5. Hence, the air-conditioning apparatus 100 is easy to construct by connecting the units (the outdoor unit 1, the relay unit 2, and the indoor units 3) by two kinds of pipes (the refrigerant pipes 4 and the heat medium pipes 5).

FIG. 1 illustrates an exemplary case in which the relay unit 2 is provided in a space such as a space above a ceiling (hereinafter simply referred to as the space 8) that is inside the building 9 but is separate from the indoor spaces 7. Alternatively, the relay unit 2 may be provided in a common space or the like where elevators or other facilities are provided. While FIG. 1 illustrates an exemplary case where the indoor units 3 are of a ceiling cassette type, the present invention is not limited to such a case. The indoor units 3 may be of any other type such as a ceiling concealed type or a ceiling suspended type, as long as heating air or cooling air can be blown into the indoor spaces 7 directly or via ducts or the like.

While FIG. 1 illustrates an exemplary case where the outdoor unit 1 is provided in the outdoor space 6, the present invention is not limited to such a case. For example, the outdoor unit 1 may be provided in an enclosed space with a vent, such as a machine room. Moreover, the outdoor unit 1 may be provided inside the building 9, as long as waste heat can be exhausted to the outside of the building 9 via an exhaust duct. If the outdoor unit 1 is of a water-cooled type, the outdoor unit 1 may be provided inside the building 9. Even if the outdoor unit 1 is provided in such a place, no particular problem arises.

The relay unit 2 may be provided near the outdoor unit 1. However, if the relay unit 2 is provided near the outdoor unit 1, the lengths of the heat medium pipes 5 that connect the relay unit 2 and the indoor units 3 are to be carefully considered. This is because of the following reason. If the distance from the relay unit 2 to each of the indoor units 3 increases, the power for transporting the heat medium increases accordingly, reducing the effect of energy saving.

The numbers of outdoor units 1, relay units 2, and indoor units 3 are not limited to those illustrated in FIG. 1 and may be determined on the basis of the building 9 in which the air-conditioning apparatus 100 is to be provided.

If a plurality of relay units 2 are connected to one outdoor unit 1, the plurality of relay units 2 may be provided at separate positions in, for example, common spaces or spaces above the ceiling of a building such as an office building. Thus, the air-conditioning load can be shared among the intermediate heat exchangers of the relay units 2. Moreover, the indoor units 3 can be provided at distances or levels that are within allowable ranges of transport by the heat medium transporting devices provided in the relay units 2. Thus, the indoor units 3 can be provided over the entirety of the building such as an office building.

FIG. 2 illustrates an exemplary refrigerant circuit configuration of the air-conditioning apparatus 100 according to Embodiment. As illustrated in FIG. 2, the outdoor unit 1 and the relay unit 2 are connected to each other by the refrigerant pipes 4 via intermediate heat exchangers 25a and 25b included in the relay unit 2. Furthermore, the relay unit 2 and the indoor units 3 are connected to each other by the heat medium pipes 5 via the intermediate heat exchangers 25a and 25b. Furthermore, the relay unit 2 and the heat medium energy storage tank device 15 are connected to each other by the refrigerant pipes 62a to 62c via an intra-energy-storage-tank heat exchanger 25c.

That is, the intermediate heat exchangers 25a and 25b exchange heat between the heat-source-side refrigerant that is supplied thereto through the refrigerant pipes 4 and the heat medium that is supplied thereto through the heat medium pipes 5. The intra-energy-storage-tank heat exchanger 25c exchanges heat between the heat-source-side refrigerant that is supplied thereto through the refrigerant pipes 62a to 62c and the heat medium in a heat medium energy storage tank 60 to be described below.

The refrigerant pipes 4, the heat medium pipes 5, and the refrigerant pipes 62a to 62c will be described separately below.

[Outdoor Unit 1]

The outdoor unit 1 includes a compressor 10, a first refrigerant flow switching device 11 such as a four-way valve, a heat-source-side heat exchanger 12, and an accumulator 19 that are connected to one another by the refrigerant pipes 4. The outdoor unit 1 further includes a first connection pipe 4a, a second connection pipe 4b, and check valves 13a to 13d. With the first connection pipe 4a, the second connection pipe 4b, and the check valves 13a to 13d, the air-conditioning apparatus 100 allows the heat-source-side refrigerant to flow in a specific direction from the outdoor unit 1 into the relay unit 2, regardless of whether the air-conditioning apparatus 100 is in a heating operation mode or in a cooling operation mode.

The compressor 10 sucks the refrigerant, compresses the refrigerant to a high temperature and a high pressure, and then transports the refrigerant to the refrigerant circuit A. The compressor 10 is connected to the first refrigerant flow switching device 11 on a discharge side thereof and to the accumulator 19 on a suction side thereof. The compressor 10 may be, for example, an inverter compressor whose capacity is controllable.

The first refrigerant flow switching device 11 allows the discharge side of the compressor 10 and the check valve 13d to be connected to each other and the heat-source-side heat exchanger 12 and a suction side of the accumulator 19 to be connected to each other in the heating only operation mode and in the heating main operation mode included in the cooling and heating mixed operation mode. The first refrigerant flow switching device 11 also allows the discharge side of the compressor 10 and the heat-source-side heat exchanger 12 to be connected to each other and the check valve 13c and the suction side of the accumulator 19 to be connected to each other in the cooling only operation mode and in the cooling main operation mode included in the cooling and heating mixed operation mode.

The heat-source-side heat exchanger 12 functions as an evaporator in the heating operation and as a condenser (or a radiator) in the cooling operation. The heat-source-side heat exchanger 12 exchanges heat between air as a fluid that is supplied thereto from a non-illustrated air-sending device such as a fan and the heat-source-side refrigerant, whereby the heat-source-side heat exchanger 12 evaporates and gasifies or condenses and liquefies the heat-source-side refrigerant. In the heating operation mode, the heat-source-side heat exchanger 12 is connected to the check valve 13b on one side thereof and to the suction side of the accumulator 19 on the other side thereof. In the cooling operation mode, the heat-source-side heat exchanger 12 is connected to the discharge side of the compressor 10 on one side thereof and to the check valve 13a on the other side thereof. The heat-source-side heat exchanger 12 may be, for example, a plate-fin-and-tube heat exchanger that is capable of exchanging heat between the refrigerant flowing through the refrigerant pipe and air flowing through the fins.

The accumulator 19 accumulates excessive refrigerant occurring because of the difference between a state in the heating operation mode and a state in the cooling operation mode and excessive refrigerant occurring because of changes in the transition of the operation (for example, a change in the number of indoor units 3 that are in operation). In the heating operation mode, the accumulator 19 is connected to the heat-source-side heat exchanger 12 on the suction side thereof and to the suction side of the compressor 10 on a discharge side thereof. In the cooling operation mode, the accumulator 19 is connected to the check valve 13c on the suction side thereof and to the suction side of the compressor 10 on the discharged side thereof.

The check valve 13c is provided in one of the refrigerant pipes 4 that extends between the relay unit 2 and the first refrigerant flow switching device 11 and allows the heat-source-side refrigerant to flow only in a predetermined direction (a direction from the relay unit 2 to the outdoor unit 1).

The check valve 13a is provided in the other refrigerant pipe 4 that extends between the heat-source-side heat exchanger 12 and the relay unit 2 and allows the heat-source-side refrigerant to flow only in a predetermined direction (a direction from the outdoor unit 1 to the relay unit 2).

The check valve 13d is provided in the first connection pipe 4a and allows the heat-source-side refrigerant that has been discharged from the compressor 10 to flow into the relay unit 2 in the heating operation.

The check valve 13b is provided in the second connection pipe 4b and allows the heat-source-side refrigerant that has returned from the relay unit 2 to flow toward the suction side of the compressor 10 in the heating operation.

The first connection pipe 4a in the outdoor unit 1 connects a portion of the one refrigerant pipe 4 between the first refrigerant flow switching device 11 and the check valve 13c and a portion of the other refrigerant pipe 4 between the check valve 13a and the relay unit 2 to each other. The second connection pipe 4b in the outdoor unit 1 connects a portion of the one refrigerant pipe 4 between the check valve 13c and the relay unit 2 and a portion of the other refrigerant pipe 4 between the heat-source-side heat exchanger 12 and the check valve 13a to each other. While FIG. 2 illustrates an exemplary case where the first connection pipe 4a, the second connection pipe 4b, the check valve 13a, the check valve 13b, the check valve 13c, and the check valve 13d are provided, the present invention is not limited to such a case. All the foregoing elements are not necessarily provided.

[Indoor Units 3]

The indoor units 3 include respective use-side heat exchangers 35a to 35d (also simply denoted as use-side heat exchangers 35). The use-side heat exchangers 35 are connected to respective heat medium flow control devices 34a to 34d (also simply denoted as heat medium flow control devices 34) via corresponding ones of the heat medium pipes 5 and to respective second heat medium flow switching devices 33a to 33d (also simply denoted as second heat medium flow switching devices 33) via corresponding ones of the heat medium pipes 5. The use-side heat exchangers 35 each exchange heat between air that is supplied thereto from a non-illustrated air-sending device such as a fan and the heat medium, thereby generating heating air or cooling air to be supplied to a corresponding one of the indoor spaces 7.

FIG. 2 illustrates an exemplary case where four indoor units 3a to 3d are connected to the relay unit 2 by the heat medium pipes 5. The use-side heat exchangers 35 are arranged in correspondence with the indoor units 3a to 3d in the following order from the upper side of the page: the use-side heat exchanger 35a, the use-side heat exchanger 35b, the use-side heat exchanger 35c, and the use-side heat exchanger 35d. The number of indoor units 3 is not limited to four.

[Relay Unit 2]

The relay unit 2 includes the two intermediate heat exchangers 25a and 25b (also simply denoted as intermediate heat exchangers 25), two first expansion devices 26a and 26b (also simply denoted as first expansion devices 26), two opening and closing devices (an opening and closing device 27 and an opening and closing device 29), two second refrigerant flow switching devices 28 (also simply denoted as second refrigerant flow switching devices 28), two pumps 31a and 31b (also simply denoted as pumps 31), four first heat medium flow switching devices 32a to 32d (also simply denoted as first heat medium flow switching devices 32), the four second heat medium flow switching devices 33a to 33d (also simply denoted as second heat medium flow switching devices 33), and the four heat medium flow control devices 34a to 34d (also simply denoted as heat medium flow control devices 34).

The intermediate heat exchangers 25, functioning as condensers (radiators) or evaporators, each exchange heat between the heat-source-side refrigerant and the heat medium and transfer the cooling energy or the heating energy generated by the outdoor unit 1 and stored in the heat-source-side refrigerant to the heat medium. That is, in the heating operation, the intermediate heat exchangers 25 each function as a condenser (radiator) and transfer the heating energy of the heat-source-side refrigerant to the heat medium; in the cooling operation, the intermediate heat exchangers 25 each function as an evaporator and transfer the cooling energy of the heat-source-side refrigerant to the heat medium.

The intermediate heat exchanger 25a is provided between the first expansion device 26a and the second refrigerant flow switching device 28a in the refrigerant circuit A and is used for cooling the heat medium in the cooling and heating mixed operation mode. The intermediate heat exchanger 25b is provided between the first expansion device 26b and the second refrigerant flow switching device 28b in the refrigerant circuit A and is used for heating the heat medium in the cooling and heating mixed operation mode.

The first expansion devices 26 each have a function as a pressure reducing valve or an expansion valve and expand the heat-source-side refrigerant by reducing the pressure of the heat-source-side refrigerant. The first expansion device 26a is provided on the upstream side of the intermediate heat exchanger 25a in the flow of the heat-source-side refrigerant in the cooling operation. The first expansion device 26b is provided on the upstream side of the intermediate heat exchanger 25b in the flow of the heat-source-side refrigerant in the cooling operation. The first expansion devices 26 may each be a device whose opening degree is variably controllable, such as an electronic expansion valve.

The opening and closing device 27 and the opening and closing device 29 are each, for example, a solenoid valve that opens and closes with energization. The opening and closing device 27 and the opening and closing device 29 open or close respective passages on which they are provided. That is, the opening and closing device 27 and the opening and closing device 29 are controlled to be opened or closed in accordance with the operation mode and thus switch the passage of the heat-source-side refrigerant.

The opening and closing device 27 is provided in the refrigerant pipe 4 that is on a side of the entrance for the heat-source-side refrigerant (one of the refrigerant pipes 4 connecting the outdoor unit 1 and the relay unit 2 that is illustrated at the lowest position of the page). The opening and closing device 29 is provided in a pipe (a bypass pipe 20) connecting the refrigerant pipe 4 that is on the side of the entrance for the heat-source-side refrigerant and the refrigerant pipe 4 that is on a side of the exit for the heat-source-side refrigerant to each other. The opening and closing device 27 and the opening and closing device 29 only need to be capable of opening and closing the respective passages on which they are provided, and may each be, for example, an electronic expansion valve whose opening degree is controllable.

The second refrigerant flow switching devices 28 are each, for example, a four way valve and switch the flow of the heat-source-side refrigerant such that the intermediate heat exchangers 25 function as condensers or evaporators in accordance with the operation mode. The second refrigerant flow switching device 28a is provided on the downstream side of the intermediate heat exchanger 25a in the flow of the heat-source-side refrigerant in the cooling operation. The second refrigerant flow switching device 28b is provided on the downstream side of the intermediate heat exchanger 25b in the flow of the heat-source-side refrigerant in the cooling only operation mode.

The pumps 31 cause the heat medium flowing in the heat medium pipes 5 to circulate through the heat medium circuit B. The pump 31a is provided in one of the heat medium pipes 5 that extends between the intermediate heat exchanger 25a and the second heat medium flow switching devices 33. The pump 31b is provided in another one of the heat medium pipes 5 that extends between the intermediate heat exchanger 25b and the second heat medium flow switching devices 33. The pumps 31 may be, for example, pumps whose capacities are controllable so that the flow rates thereof are adjustable in accordance with the loads occurring in the indoor units 3.

The first heat medium flow switching devices 32 each switch the connection at a position between a heat medium passage on the exit side of a corresponding one of the use-side heat exchangers 35 and heat medium passages on the entrance side of the intermediate heat exchangers 25. The number of first heat medium flow switching devices 32 (four in this case) corresponds to the number of indoor units 3. The first heat medium flow switching devices 32 each have three ways, one of which is connected to the intermediate heat exchanger 25a, another of which is connected to the intermediate heat exchanger 25b, and the remainder of which is connected to a corresponding one of the heat medium flow control devices 34. The first heat medium flow switching devices 32 are provided in the respective heat medium passages on the exit side of the use-side heat exchangers 35 and are arranged in correspondence with the indoor units 3 in the following order from the upper side of the page: the first heat medium flow switching device 32a, the first heat medium flow switching device 32b, the first heat medium flow switching device 32c, and the first heat medium flow switching device 32d. The switching of each heat medium passage includes not only full switching from one way to another but also partial switching from one way to another. The first heat medium flow switching devices 32 may each be, for example, a three-way valve.

The second heat medium flow switching devices 33 each switch the connection at a position between a heat medium passage on the entrance side of a corresponding one of the use-side heat exchangers 35 and heat medium passages on the exit side of the intermediate heat exchangers 25. The number of second heat medium flow switching devices 33 (four in this case) corresponds to the number of indoor units 3. The second heat medium flow switching devices 33 each have three ways, one of which is connected to the intermediate heat exchanger 25a, another of which is connected to the intermediate heat exchanger 25b, and the remainder of which is connected to a corresponding one of the use-side heat exchangers 35. The second heat medium flow switching devices 33 are provided in the respective heat medium passages on the entrance side of the use-side heat exchangers 35 and are arranged in correspondence with the indoor units 3 in the following order from the upper side of the page: the second heat medium flow switching device 33a, the second heat medium flow switching device 33b, the second heat medium flow switching device 33c, and the second heat medium flow switching device 33d. The switching of each heat medium passage includes not only full switching from one way to another but also partial switching from one way to another. The second heat medium flow switching devices 33 may each be, for example, a three-way valve.

The heat medium flow control devices 34 are each a two-way valve or the like whose opening area is controllable, and each control the flow rate of the heat medium flowing in a corresponding one of the heat medium pipes 5. The number of heat medium flow control devices 34 (four in this case) corresponds to the number of indoor units 3. One way of each heat medium flow control device 34 is connected to a corresponding one of the use-side heat exchangers 35, and the other way of each heat medium flow control device 34 is connected to a corresponding one of the first heat medium flow switching devices 32. The heat medium flow control devices 34 are provided in the respective heat medium passages on the exit side of the use-side heat exchangers 35. That is, the heat medium flow control devices 34 each adjust the volume of heat medium flowing into a corresponding one of the indoor units 3 in accordance with the temperature of the heat medium flowing into the indoor unit 3 and the temperature of the heat medium flows out of the indoor unit 3, thereby allowing a volume of heat medium that is most suitable for the load occurring in a corresponding one of the rooms to be supplied to the indoor unit 3.

The heat medium flow control device 34a, the heat medium flow control device 34b, the heat medium flow control device 34c, and the heat medium flow control device 34d are arranged in that order from the upper side of the page in accordance with the indoor units 3. The heat medium flow control devices 34 may alternatively be provided in the respective heat medium passages on the entrance side of the use-side heat exchangers 35. Moreover, the heat medium flow control devices 34 may each be provided in a corresponding one of the heat medium passages on the entrance side of the use-side heat exchangers 35 and between a corresponding one of the second heat medium flow switching devices 33 and a corresponding one of the use-side heat exchangers 35. When no loads are requested on the indoor units 3 because, for example, when the indoor units 3 are in the stop mode or in the state where the thermostats are off, the heat medium flow control devices 34 are fully closed, whereby the supply of the heat medium to the indoor units 3 is stopped.

If the first heat medium flow switching devices 32 or the second heat medium flow switching devices 33 additionally have a function as the heat medium flow control devices 34, the heat medium flow control devices 34 are omittable.

The relay unit 2 includes two temperature sensors 40a and 40b (also simply denoted as temperature sensors 40) that each detect the temperature of the heat medium on the exit side of a corresponding one of the intermediate heat exchangers 25. Information (temperature information) detected by the temperature sensors 40 is sent to a controller 50 that generally controls the operation of the air-conditioning apparatus 100, and is used for controlling the driving frequency of the compressor 10, the rotation speeds of the non-illustrated air-sending devices, the switching of the first refrigerant flow switching device 11, the driving frequencies of the pumps 31, the switching of the second refrigerant flow switching devices 28, the switching of the heat medium passages, the adjustment of the flow rates of the heat medium in the indoor units 3, and so forth. While the above description concerns an exemplary case where the controller 50 is provided in the relay unit 2, the present invention is not limited to such a case. The controller 50 may be communicably provided in the outdoor unit 1, each of the indoor units 3, or in each of all the foregoing units.

The temperature sensors 40 each detect the temperature of the heat medium that has been discharged from a corresponding one of the intermediate heat exchangers 25. That is, the temperature sensors 40 each detect the temperature of the heat medium at the exit of a corresponding one of the intermediate heat exchangers 25. The temperature sensor 40a is provided on one of the heat medium pipes 5 that is on the heat-medium-suction side of the pump 31a. The temperature sensor 40b is provided on another one of the heat medium pipes 5 that is on the heat-medium-suction side of the pump 31b. The temperature sensors 40 may each be, for example, a thermistor.

The controller 50 includes a microprocessor or the like and controls the following on the basis of the results of detections obtained by various detecting means and instructions from remote controllers: the driving frequency of the compressor 10, the rotation speeds (including the on and off states) of the air-sending devices, the switching of the first refrigerant flow switching device 11, the driving of the pumps 31, the opening degrees of the first expansion devices 26, the opening degree of a second expansion device 26c, the switching of the second refrigerant flow switching devices 28, the switching of the first heat medium flow switching devices 32, the switching of the second heat medium flow switching devices 33, the switching of a third refrigerant flow switching device 28c, the driving of the heat medium flow control devices 34, the driving of heat medium passage opening and closing devices 37, the opening and closing of the opening and closing devices 27 and 29, the opening and closing of heat medium passage opening and closing devices 36, and so forth. That is, the controller 50 controls actuators and the like included in the above devices, thereby executing operations in different modes, to be described below, and switching the heat medium passages to be connected to the heat medium energy storage tank 60.

The heat medium pipes 5 through which the heat medium flows include those connected to the intermediate heat exchanger 25a and those connected to the intermediate heat exchanger 25b. The foregoing heat medium pipes 5 each have branches (four branches in this case) in correspondence with the number of indoor units 3 connected to the relay unit 2. The heat medium pipes 5 that are connected to the intermediate heat exchanger 25a and the heat medium pipes 5 that are connected to the intermediate heat exchanger 25b are connected to each other at the first heat medium flow switching devices 32 and the second heat medium flow switching devices 33. Controlling the first heat medium flow switching devices 32 and the second heat medium flow switching devices 33 determines which of the heat medium from the intermediate heat exchanger 25a and the heat medium from the intermediate heat exchanger 25b is allowed to flow into the use-side heat exchangers 35.

[Heat Medium Energy Storage Tank Device 15]

The heat medium energy storage tank device 15 includes the heat medium energy storage tank 60, the second expansion device 26c, the third refrigerant flow switching device 28c, and the two heat medium passage opening and closing devices 37a and 37b (also simply denoted as heat medium passage opening and closing devices 37). The heat medium energy storage tank device 15 is connected to the refrigerant circuit A by the refrigerant pipes 62a to 62c and to the heat medium circuit B by the heat medium pipes 61a to 61d.

The heat medium energy storage tank 60 (heat medium energy storage) stores the heat medium. The heat medium energy storage tank 60 includes the intra-energy-storage-tank heat exchanger 25c (intra-storage heat exchanger) that transfers the heating energy or the cooling energy generated by the outdoor unit 1 to the heat medium stored in the heat medium energy storage tank 60 (the heat medium is stored with heating energy or cooling energy). That is, the heat medium that is stored with heating energy refers to the heat medium that is heated in the heat medium energy storage tank 60 and is stored in the heat medium energy storage tank 60. The heat medium that is stored with cooling energy refers to the heat medium that is cooled in the heat medium energy storage tank 60 and is stored in the heat medium energy storage tank 60.

The heat medium to which the heating energy or the cooling energy is transferred is supplied to the use-side heat exchangers 35 and is used for heating or cooling in accordance with the operation mode to be described below.

The heating energy or the cooling energy generated by the outdoor unit 1 flows through the refrigerant pipes 62a to 62c into the intra-energy-storage-tank heat exchanger 25c provided in the heat medium energy storage tank 60. The heating energy or the cooling energy that has been stored in the intra-energy-storage-tank heat exchanger 25c is transferred to the heat medium that is stored in the heat medium energy storage tank 60. Furthermore, the heat medium that is heated or cooled by the heating energy or the cooling energy transferred thereto flows through the heat medium pipes 61a to 61d into the heat medium circuit B and is then supplied to the use-side heat exchangers 35.

The intra-energy-storage-tank heat exchanger 25c (intra-thermal-storage-means heat exchanger) exchanges heat between the refrigerant having flowed from the refrigerant circuit A into the heat medium energy storage tank device 15 and the heat medium in the heat medium energy storage tank 60. The intra-energy-storage-tank heat exchanger 25c is connected to the third refrigerant flow switching device 28c on one side thereof and to the second expansion device 26c on the other side thereof. The intra-energy-storage-tank heat exchanger 25c is connected in parallel with the intermediate heat exchangers 25a and 25b. The intra-energy-storage-tank heat exchanger 25c is provided in the heat medium energy storage tank 60. The intra-energy-storage-tank heat exchanger 25c may be, for example, a coil of refrigerant pipe as illustrated in FIG. 2, or a plate-fin heat exchanger.

The second expansion device 26c has a function as a pressure reducing valve or an expansion valve and expands the heat-source-side refrigerant by reducing the pressure of the heat-source-side refrigerant. The second expansion device 26c is connected to the refrigerant pipe 62c on one side thereof and to the intra-energy-storage-tank heat exchanger 25c on the other side thereof. The second expansion device 26c may be a device whose opening degree is variably controllable, such as an electronic expansion valve.

The third refrigerant flow switching device 28c is, for example, a four-way valve and switches the flow of the heat-source-side refrigerant such that the intra-energy-storage-tank heat exchanger 25c functions as a condenser (radiator) or an evaporator in accordance with the operation mode. The third refrigerant flow switching device 28c is connected to the refrigerant pipes 62a and 62b and the intra-energy-storage-tank heat exchanger 25c.

The two heat medium passage opening and closing devices 37a and 37b are each a two-way valve or the like that is capable of controlling the opening and closing of a corresponding one of the passages on the basis of the opening area thereof. The heat medium passage opening and closing devices 37a and 37b each control, in accordance with the operation mode, the flow rate of the heat medium that flows into the heat medium energy storage tank 60.

The heat medium passage opening and closing device 37a is connected to the heat medium pipe 61a on one side thereof and to the heat medium energy storage tank 60 that stores the heat medium on the other side thereof. The heat medium passage opening and closing device 37b is connected to the heat medium pipe 61c on one side thereof and to the heat medium energy storage tank 60 that stores the heat medium on the other side thereof.

The refrigerant pipe 62a is connected to the third refrigerant flow switching device 28c on one side thereof and to one of the refrigerant pipes 4 through which the refrigerant flows from the relay unit 2 toward the outdoor unit 1 on the other side thereof.

The refrigerant pipe 62b is connected to the third refrigerant flow switching device 28c on one side thereof and to another one of the refrigerant pipes 4 through which the refrigerant flows from the outdoor unit 1 toward the relay unit 2 on the other side thereof.

The refrigerant pipe 62c is connected to the intra-energy-storage-tank heat exchanger 25c on one side thereof and to yet another one of the refrigerant pipes 4 that connects the opening and closing device 27, the opening and closing device 29, and the first expansion devices 26 to one another on the other side thereof.

The heat medium pipe 61a is connected to the heat medium energy storage tank 60 via the heat medium passage opening and closing device 37a on one side thereof and to a portion of one of the heat medium pipes 5 that connects the intermediate heat exchanger 25a and a heat medium passage opening and closing device 36a to each other on the other side thereof.

The heat medium pipe 61b is connected to the heat medium energy storage tank 60 on one side thereof and to another portion of the heat medium pipe 5 that connects the heat medium passage opening and closing device 36a and the first heat medium flow switching devices 32 to each other on the other side thereof.

The heat medium pipe 61c is connected to the heat medium energy storage tank 60 via the heat medium passage opening and closing device 37b on one side thereof and to a portion of another one of the heat medium pipes 5 that connects the intermediate heat exchanger 25b and a heat medium passage opening and closing device 36b to each other on the other side thereof.

The heat medium pipe 61d is connected to the heat medium energy storage tank 60 on one side thereof and to another portion of the heat medium pipe 5 that connects the heat medium passage opening and closing device 36b and the first heat medium flow switching devices 32 to each other on the other side thereof.

The heat medium passage opening and closing device 36a is provided at a position of the heat medium pipe 5 that is between the position where the heat medium pipe 61a is connected and the position where the heat medium pipe 61b is connected. The heat medium passage opening and closing device 36b is provided at a position of the heat medium pipe 5 that is between the position where the heat medium pipe 61c is connected and the position where the heat medium pipe 61d is connected. The two heat medium passage opening and closing devices 36a and 36b (also simply denoted as heat medium passage opening and closing devices 36) are each, for example, a two-way valve that is capable of opening and closing a corresponding one of the passages. The heat medium passage opening and closing devices 36a and 36b are connected to the respective heat medium pipes 5 included in the heat medium circuit B in the relay unit 2.

The heat medium passage opening and closing devices 36 may each be a three-way valve. That is, if the heat medium passage opening and closing device 36a is a three-way valve, two of the connection ports thereof may be connected to the respective heat medium pipes 5 as described above, and the remaining connection port thereof may be connected to the other side of the heat medium pipe 61a or the other side of the heat medium pipe 61b. Moreover, if the heat medium passage opening and closing device 36b is a three-way valve, two of the connection ports thereof may be connected to the respective heat medium pipes 5 as described above, and the remaining connection port thereof may be connected to the other side of the heat medium pipe 61c or the other side of the heat medium pipe 61d.

In the air-conditioning apparatus 100, the compressor 10, the first refrigerant flow switching device 11, the heat-source-side heat exchanger 12, the opening and closing device 27, the opening and closing device 29, the second refrigerant flow switching devices 28, the refrigerant passages of the intermediate heat exchangers 25, the first expansion devices 26, and the accumulator 19 are connected to one another by the refrigerant pipes 4, whereby the refrigerant circuit A is built. Furthermore, the heat medium passages of the intermediate heat exchangers 25, the pumps 31, the first heat medium flow switching devices 32, the heat medium flow control devices 34, the use-side heat exchangers 35, and the second heat medium flow switching devices 33 are connected to one another by the heat medium pipes 5, whereby the heat medium circuit B is built. That is, a plurality of use-side heat exchangers 35 are connected in parallel to each of the intermediate heat exchangers 25, whereby the heat medium circuit B includes a plurality of systems.

Hence, in the air-conditioning apparatus 100, the outdoor unit 1 and the relay unit 2 are connected to each other via the intermediate heat exchanger 25a and the intermediate heat exchanger 25b provided in the relay unit 2, and the relay unit 2 and the indoor units 3 are connected to each other via the intermediate heat exchanger 25a and the intermediate heat exchanger 25b. That is, in the air-conditioning apparatus 100, the heat-source-side refrigerant circulating through the refrigerant circuit A and the heat medium circulating through the heat medium circuit B exchange their heat in the intermediate heat exchanger 25a and in the intermediate heat exchanger 25b. With such a configuration, the air-conditioning apparatus 100 realizes a cooling operation or a heating operation that is most suitable for the loads occurring in the rooms.

The modes of operations performed by the air-conditioning apparatus 100 include the heating only operation mode in which the indoor units 3 that are in operation are all performing heating operations, the cooling only operation mode in which the indoor units 3 that are in operation are all performing cooling operations, the cooling main operation mode included in the cooling and heating mixed operation mode and in which the cooling load is larger than the heating load, and the heating main operation mode included in the cooling and heating mixed operation mode and in which the heating load is larger than the cooling load. These operation modes are realized by combining the switching of the first refrigerant flow switching device 11, the second refrigerant flow switching devices 28, the first heat medium flow switching devices 32, and the second heat medium flow switching devices 33 and the opening and closing of the opening and closing device 27 and the opening and closing device 29.

Modes of operations performed by the air-conditioning apparatus 100 using the heat medium energy storage tank device 15 include a heating energy storing mode, a stored heating energy transfer mode, a cooling energy storing mode, a stored cooling energy transfer mode, a continuous cooling operation and energy storing mode, and a continuous heating operation and energy storing mode.

The heating energy storing mode is an operation mode in which heating energy that is available in performing heating operations on the indoor units 3 is stored (the heat medium is stored with heating energy).

The stored heating energy transfer mode is an operation mode in which the heating energy stored in the heating energy storing mode is transported to the use-side heat exchangers 35 of the indoor units 3.

The cooling energy storing mode is an operation mode in which cooling energy that is available in performing cooling operations on the indoor units 3 is stored (the heat medium is stored with cooling energy).

The stored cooling energy transfer mode is an operation mode in which the cooling energy stored in the cooling energy storing mode is transported to the use-side heat exchangers 35 of the indoor units 3.

The continuous cooling operation and energy storing mode is an operation mode in which heating energy that is available in performing heating operations is stored (the heat medium is stored with heating energy) while cooling operations are being continued on the indoor units 3.

The continuous heating operation and energy storing mode is an operation mode in which cooling energy that is available in performing cooling operations is stored (the heat medium is stored with cooling energy) while heating operations are being continued on the indoor units 3.

The above modes will now be described.

[Heating Energy Storing Mode (Stop Mode)]

Figure 3:
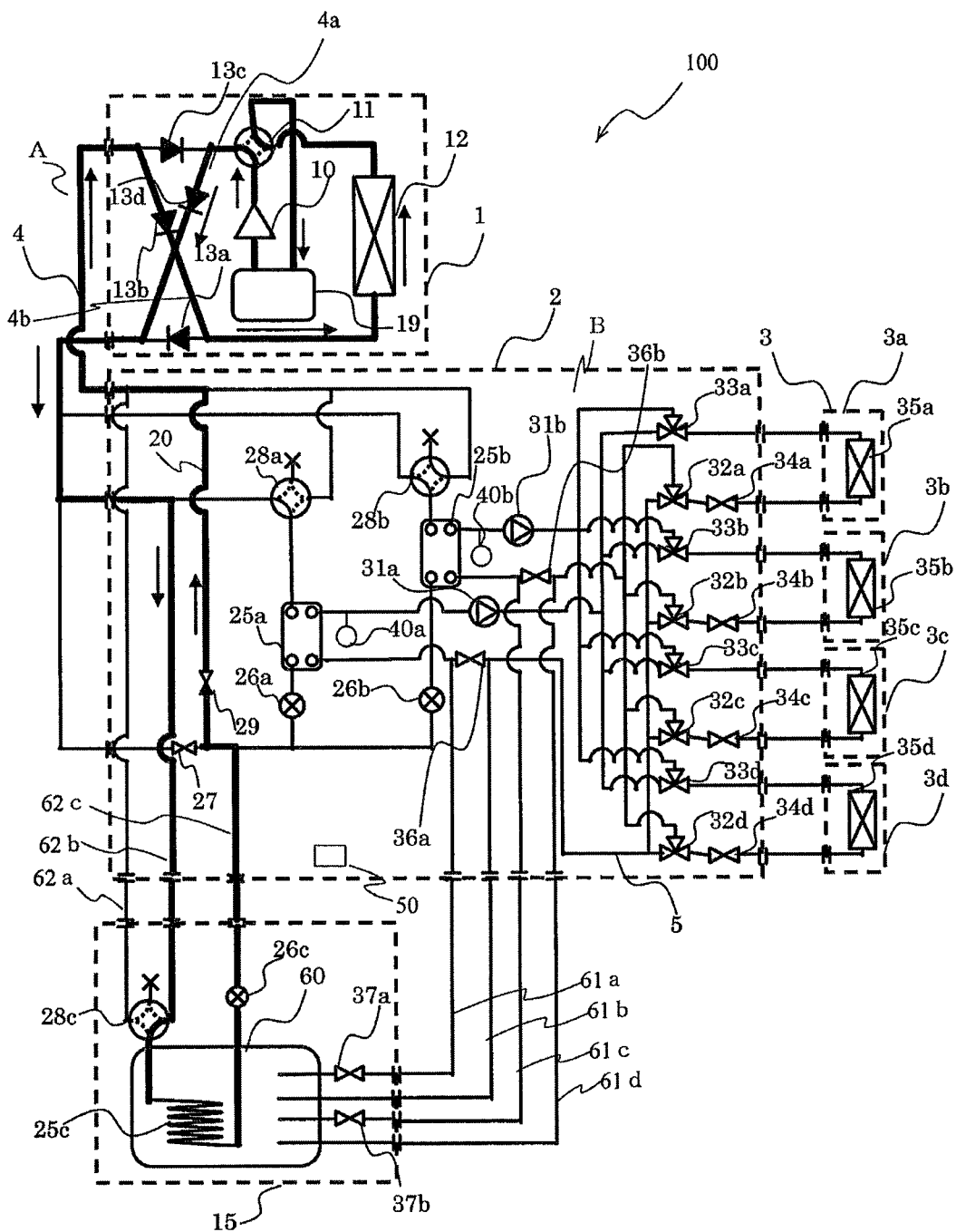
FIG. 3 is a refrigerant circuit diagram illustrating the flow of a refrigerant when the air-conditioning apparatus illustrated in FIG. 2 is in a heating energy storing mode.

FIG. 3 is a refrigerant circuit diagram illustrating the flow of the refrigerant when the air-conditioning apparatus 100 illustrated in FIG. 2 is in the heating energy storing mode. FIG. 3 illustrates an exemplary case of the heating energy storing mode where the four indoor units 3a to 3d are in the stop mode. When the temperatures in the indoor spaces 7 have reached respective preset temperatures, the air-conditioning apparatus 100 changes the mode to the stop mode and stops the supply of the heat medium from the pumps 31a and 31b to the four use-side heat exchangers 35a to 35d. Furthermore, since the operation is in the stop mode, the operation of the fans provided to the four respective use-side heat exchangers 35 is stopped.

In FIG. 3, pipes through which the heat-source-side refrigerant flows are represented by bold lines, and the direction in which the heat-source-side refrigerant flows is represented by solid-line arrows.

In the heating energy storing mode (stop mode), the first refrigerant flow switching device 11 included in the outdoor unit 1 is switched in such a manner as to allow the heat-source-side refrigerant that has been discharged from the compressor 10 to flow into the relay unit 2 without flowing through the heat-source-side heat exchanger 12.

In the relay unit 2, since the four indoor units 3 are in the stop mode, the four first heat medium flow switching devices 32a to 32d, the four second heat medium flow switching devices 33a to 33d, and the four heat medium flow control devices 34a to 34d are closed. Furthermore, the opening and closing device 27 is closed, the opening and closing device 29 is open, and the first expansion device 26a and the first expansion device 26b are closed.

The operation of the pumps 31, the opening and closing of the heat medium passage opening and closing devices 36, and the switching of the second refrigerant flow switching devices 28 are arbitrary.

In the heat medium energy storage tank device 15, the third refrigerant flow switching device 28c is switched in such a manner as to connect the intra-energy-storage-tank heat exchanger 25c and the refrigerant pipe 62b to each other. The heat medium passage opening and closing device 37a and the heat medium passage opening and closing device 37b are not necessarily opened or closed.

First, the flow of the heat-source-side refrigerant in the refrigerant circuit A will be described.

A low-temperature, low-pressure refrigerant is compressed by the compressor 10 and is discharged from the compressor 10 in the form of a high-temperature, high-pressure gas refrigerant. The high-temperature, high-pressure gas refrigerant that has been discharged from the compressor 10 flows through the first refrigerant flow switching device 11 and the first connection pipe 4a and flows out of the outdoor unit 1. The high-temperature, high-pressure gas refrigerant that has flowed out of the outdoor unit 1 flows through the refrigerant pipe 4 into the relay unit 2. The high-temperature, high-pressure gas refrigerant that has flowed into the relay unit 2 flows into the heat medium energy storage tank device 15. The high-temperature, high-pressure gas refrigerant that has flowed into the heat medium energy storage tank device 15 flows through the third refrigerant flow switching device 28c into the intra-energy-storage-tank heat exchanger 25c.

The high-temperature, high-pressure gas refrigerant that has flowed into the intra-energy-storage-tank heat exchanger 25c transfers its heat to the heat medium in the heat medium energy storage tank 60, thereby being condensed and liquefied into a high-pressure liquid refrigerant. The liquid refrigerant that has flowed out of the intra-energy-storage-tank heat exchanger 25c is expanded by the second expansion device 26c, thereby turning into a low-temperature, low-pressure two-phase refrigerant. The two-phase refrigerant flows into the outdoor unit 1 again via the refrigerant pipe 4. The refrigerant that has flowed into the outdoor unit 1 flows through the second connection pipe 4b into the heat-source-side heat exchanger 12 that is functioning as an evaporator.

The heat-source-side refrigerant that has flowed into the heat-source-side heat exchanger 12 receives heat from air in the outdoor space 6 (hereinafter also referred to as outside air) in the heat-source-side heat exchanger 12, thereby turning into a low-temperature, low-pressure gas refrigerant. The low-temperature, low-pressure gas refrigerant that has flowed out of the heat-source-side heat exchanger 12 flows through the first refrigerant flow switching device 11 and the accumulator 19 and is sucked into the compressor 10 again.

In this case, the opening degree of the second expansion device 26c is controlled such that the value of subcooling (the degree of subcooling) obtained as the difference between a value obtained by a conversion of the pressure of the heat-source-side refrigerant flowing between the intra-energy-storage-tank heat exchanger 25c and the second expansion device 26c into a saturated temperature and the temperature of the heat-source-side refrigerant on the exit side of the intra-energy-storage-tank heat exchanger 25c becomes constant. If the temperature at an intermediate position of the intra-energy-storage-tank heat exchanger 25c is measurable, the temperature at the intermediate position may be used instead of the saturated temperature obtained by the conversion. In that case, no pressure sensors are necessary, and the system is inexpensively formed.

The heat medium in the heat medium circuit B will now be described.

The heat medium in the heat medium energy storage tank 60 receives heating energy from the heat-source-side refrigerant that is supplied to the intra-energy-storage-tank heat exchanger 25c. That is, the heat medium in the heat medium energy storage tank 60 is stored with heat in the heating energy storing mode (stop mode). More specifically, the heating energy storing mode is an operation mode in which the heat medium that is stored in the heat medium energy storage tank 60 is preheated in preparation for restart of operations on the indoor units 3.

[Heating Energy Storing Mode (Freezing Easing Mode)]

Referring to FIG. 3, another heating energy storing mode as a freezing easing mode will now be described. The freezing easing mode concerns an operation in which freezing of the heat medium in the heat medium pipes 5 is suppressed. That is, in the heating energy storing mode (stop mode), at least a portion of the heat medium in the heat medium pipes 5 connecting the second heat medium flow switching devices 33, the use-side heat exchangers 35, and the first heat medium flow switching devices 32 is not in circulation. Therefore, if the temperature of the outside air is low, the portion of the heat medium in those heat medium pipes 5 may be frozen. Hence, in the heating energy storing mode (freezing easing mode), the pumps 31a and 31b are driven, and the first heat medium flow switching devices 32, the second heat medium flow switching devices 33, and the heat medium flow control devices 34 are opened, whereby the portion of the heat medium in the above heat medium pipes 5 is made to circulate. As in the heating energy storing mode (stop mode), the fans provided to the four respective use-side heat exchangers 35a to 35d are not in operation.

In the following description of the flows of the heat-source-side refrigerant and the heat medium in the heating energy storing mode (freezing easing mode), differences from the description in [Heating Energy Storing Mode (Stop Mode)] will be described.

In the relay unit 2, the pump 31a and the pump 31b are driven, and the heat medium flow control devices 34a to 34d are opened. Furthermore, the three connection ports of each of the second heat medium flow switching devices 33a to 33d are open so as to allow the heat medium that is supplied from the pump 31a and the pump 31b to flow into the use-side heat exchangers 35a to 35d. Furthermore, the three connection ports of each of the first heat medium flow switching devices 32a to 32d are open so as to allow the heat medium that is sent from the heat medium flow control devices 34a to 34d to flow into the heat medium pipes 61b and 61d. Thus, the heat medium circulates between each of the intermediate heat exchanger 25a and the intermediate heat exchanger 25b and the use-side heat exchangers 35a to 35d.

The heat medium passage opening and closing device 36a and the heat medium passage opening and closing device 36b are closed. Hence, the heat medium that is transported by the pump 31a and the pump 31b circulates through the heat medium energy storage tank device 15.

In the heat medium energy storage tank device 15, the heat medium passage opening and closing device 37a and the heat medium passage opening and closing device 37b are open.

The flow of the heat-source-side refrigerant in the refrigerant circuit A is the same as that described in [Heating Energy Storing Mode (Stop Mode)], and description thereof is omitted. The flow of the heat medium in the heat medium circuit B will now be described.

In the heating energy storing mode (freezing easing mode), the heating energy of the heat-source-side refrigerant is transferred to the heat medium in the intra-energy-storage-tank heat exchanger 25c, and the heat medium thus heated is made to flow through the heat medium pipes 5 by the pump 31a and the pump 31b. The heat medium that has been pressurized by and discharged from the pump 31a and the pump 31b flows through the second heat medium flow switching devices 33a to 33d into the use-side heat exchangers 35a to 35d. Meanwhile, the fans provided to the respective use-side heat exchangers 35a to 35d are not in operation. Hence, no heated air is supplied from the indoor units 3 to the rooms.

Subsequently, the heat medium flows out of the use-side heat exchangers 35a to 35d and flows into the heat medium flow control devices 34a to 34d. In this state, the heat medium flow control devices 34a to 34d are fully open, whereby the heat medium circulates through the heat medium circuit at the maximum flow rate. The heat medium that has flowed out of the heat medium flow control devices 34a to 34d flows through the first heat medium flow switching devices 32a to 32d into the heat medium pipes 61b and 61d. Then, the heat medium that has flowed into the heat medium pipes 61b and 61d flows into the heat medium energy storage tank device 15. The heat medium that has flowed into the heat medium energy storage tank device 15 flows into the heat medium energy storage tank 60.

A portion of the heat medium in the heat medium energy storage tank 60 flows through the heat medium pipe 61a into the relay unit 2, and then flows into the intermediate heat exchanger 25a. The other portion of the heat medium in the heat medium energy storage tank 60 flows through the heat medium pipe 61c into the relay unit 2, and then flows into the intermediate heat exchanger 25b. The portion of the heat medium that has flowed into the intermediate heat exchanger 25a is sucked into the pump 31a again. The portion of the heat medium that has flowed into the intermediate heat exchanger 25b is sucked into the pump 31b again.

In the heating energy storing mode (freezing easing mode), the pumps 31a and 31 b are driven. That is, the heat medium is made to flow through the heat medium pipes 5. Furthermore, the heat medium in the heat medium energy storage tank 60 receives heating energy from the heat-source-side refrigerant that is supplied to the intra-energy-storage-tank heat exchanger 25c. Thus, in the air-conditioning apparatus 100, not only because the heating energy is storable in the heat medium but also because the heated heat medium is made to flow through the heat medium pipes 5 by the pumps 31a and 31b, freezing of the heat medium in the heat medium pipes 5 is suppressed.

[Stored Heating Energy Transfer Mode]

Figure 4:
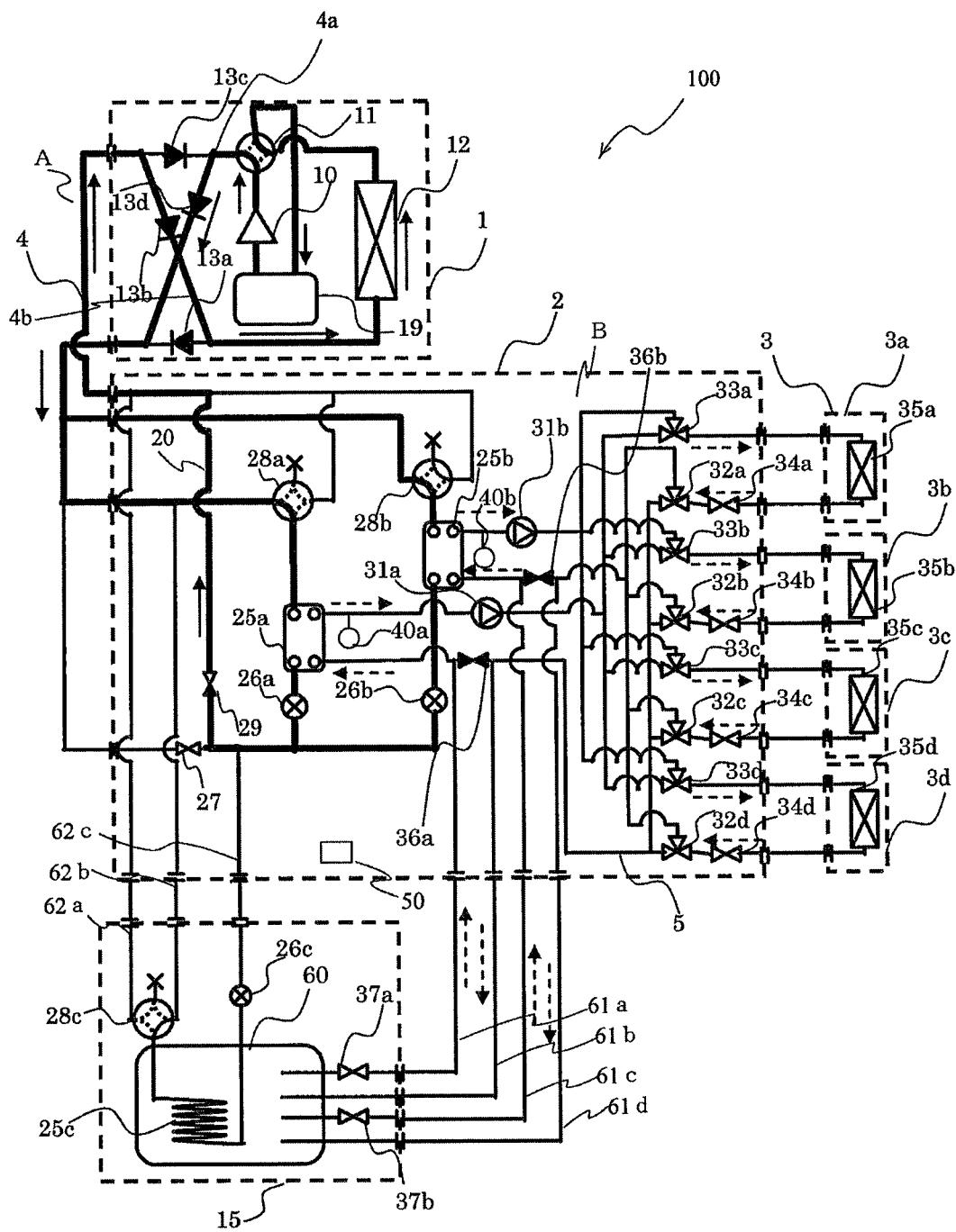
FIG. 4 is a refrigerant circuit diagram illustrating the flow of the refrigerant when the air-conditioning apparatus illustrated in FIG. 2 is in a stored heating energy transfer mode.

FIG. 4 is a refrigerant circuit diagram illustrating the flow of the refrigerant when the air-conditioning apparatus 100 illustrated in FIG. 2 is in the stored heating energy transfer mode. In FIG. 4, pipes through which the heat-source-side refrigerant flows are represented by bold lines, the direction in which the heat-source-side refrigerant flows is represented by solid-line arrows, and the direction in which the heat medium flows is represented by broken-line arrows. In FIG. 4, the four use-side heat exchangers 35a to 35d all have heating loads. That is, the four indoor units 3a to 3d are all performing heating operations.

In the stored heating energy transfer mode illustrated in FIG. 4, the first refrigerant flow switching device 11 included in the outdoor unit 1 is switched in such a manner as to allow the heat-source-side refrigerant that has been discharged from the compressor 10 to flow into the relay unit 2 without flowing through the heat-source-side heat exchanger 12.

In the relay unit 2, the pump 31a and the pump 31b are driven, and the heat medium flow control devices 34a to 34d are opened, whereby the heat medium circulates between each of the intermediate heat exchanger 25a and the intermediate heat exchanger 25b and the use-side heat exchangers 35a to 35d. Furthermore, the heat medium passage opening and closing device 36a and the heat medium passage opening and closing device 36b are closed, whereby the heat medium that is transported by the pump 31a and the pump 31b circulates the heat medium energy storage tank device 15. Furthermore, the second refrigerant flow switching device 28a and the second refrigerant flow switching device 28b are switched to the heating side, the opening and closing device 27 is closed, and the opening and closing device 29 is open. Furthermore, the three connection ports of each of the second heat medium flow switching devices 33a to 33d are open so as to allow the heat medium that is supplied from the pump 31a and the pump 31b to flow into the use-side heat exchangers 35a to 35d. Furthermore, the three connection ports of each of the first heat medium flow switching devices 32a to 32d are open so as to allow the heat medium that is sent from the heat medium flow control devices 34a to 34d to flow into the heat medium pipes 61b and 61d.

In the heat medium energy storage tank device 15, the third refrigerant flow switching device 28c is switched to the heating side, and the second expansion device 26c is fully closed. Furthermore, the heat medium passage opening and closing device 37a and the heat medium passage opening and closing device 37b are open.

The flow of the heat-source-side refrigerant in the refrigerant circuit A in the stored heating energy transfer mode illustrated in FIG. 4 is the same as that in the heating only operation mode. A high-temperature, high-pressure gas refrigerant that has been discharged from the compressor 10 flows through the first refrigerant flow switching device 11 and the first connection pipe 4a and flows out of the outdoor unit 1. The high-temperature, high-pressure gas refrigerant that has flowed out of the outdoor unit 1 flows through the refrigerant pipe 4 into the relay unit 2. The high-temperature, high-pressure gas refrigerant that has flowed into the relay unit 2 flows through the second refrigerant flow switching devices 28 into the intermediate heat exchangers 25. The high-temperature, high-pressure gas refrigerant that has flowed into the intermediate heat exchangers 25 transfers its heat to the heat medium, thereby being condensed and liquefied into a high-pressure liquid refrigerant. The liquid refrigerant that has flowed out of the intermediate heat exchangers 25 is expanded by the first expansion devices 26, thereby turning into a low-temperature, low-pressure two-phase refrigerant. The two-phase refrigerant flows through the refrigerant pipe 4 and flows into the outdoor unit 1 again. The refrigerant that has flowed into the outdoor unit 1 flows through the second connection pipe 4b into the heat-source-side heat exchanger 12 that is functioning as an evaporator. The heat-source-side refrigerant that has flowed into the heat-source-side heat exchanger 12 receives heat from air in the outdoor space 6 (hereinafter also referred to as outside air) in the heat-source-side heat exchanger 12, thereby turning into a low-temperature, low-pressure gas refrigerant. The low-temperature, low-pressure gas refrigerant that has flowed out of the heat-source-side heat exchanger 12 flows through the first refrigerant flow switching device 11 and the accumulator 19 and is sucked into the compressor 10 again.

Since the second expansion device 26c is fully closed, no heat-source-side refrigerant is supplied to the heat medium energy storage tank device 15.

The flow of the heat medium in the heat medium circuit B will now be described. In the stored heating energy transfer mode, the heat medium that has been heated in the heating energy storing mode is made to flow through the heat medium pipes 5. That is, in the heating energy storing mode, the heat medium stores the heating energy transferred thereto from the heat-source-side refrigerant that is supplied to the intra-energy-storage-tank heat exchanger 25c, and the heat medium is then made to flow through the heat medium pipes 5 by the pump 31a and the pump 31b. Thus, the heat medium that has been pressurized by and discharged from the pump 31a and the pump 31b flows through the second heat medium flow switching devices 33a to 33d into the use-side heat exchangers 35a to 35d. Then, the heat medium transfers its heat to the indoor air in the use-side heat exchangers 35a to 35d, whereby the indoor spaces 7 are heated.

Subsequently, the heat medium flows out of the use-side heat exchangers 35a to 35d and flows into the heat medium flow control devices 34a to 34d. In this state, the heat medium flow control devices 34a to 34d control the heat medium to flow into the use-side heat exchangers 35a to 35d at respective flow rates required for handling the air-conditioning loads required in the respective rooms. The heat medium that has flowed out of the heat medium flow control devices 34a to 34d flows through the first heat medium flow switching devices 32a to 32d, branched, and is directed to the heat medium energy storage tank device 15. The heat medium that has flowed into the heat medium energy storage tank device 15 is mixed with the heat medium in the heat medium energy storage tank 60, flows through the heat medium passage opening and closing device 37a and the heat medium passage opening and closing device 37b, flows into the relay unit 2 again, further flows into and through the intermediate heat exchanger 25a and the intermediate heat exchanger 25b, and is sucked into the pump 31a and the pump 31b again.

Since the air-conditioning apparatus 100 according to Embodiment has the heating energy storing mode (stop mode), the heat medium that is stored in the heat medium energy storage tank 60 is preheatable (storable with heating energy) in preparation for restart of operations on the indoor units 3. In restarting heating operations, since the stored heating energy transfer mode is executed, the heat medium that has been stored with heating energy is transported to the use-side heat exchangers 35. Therefore, the start-up time taken for the heating operations is reduced.

[Cooling Energy Storing Mode (Stop Mode)]

Figure 5:
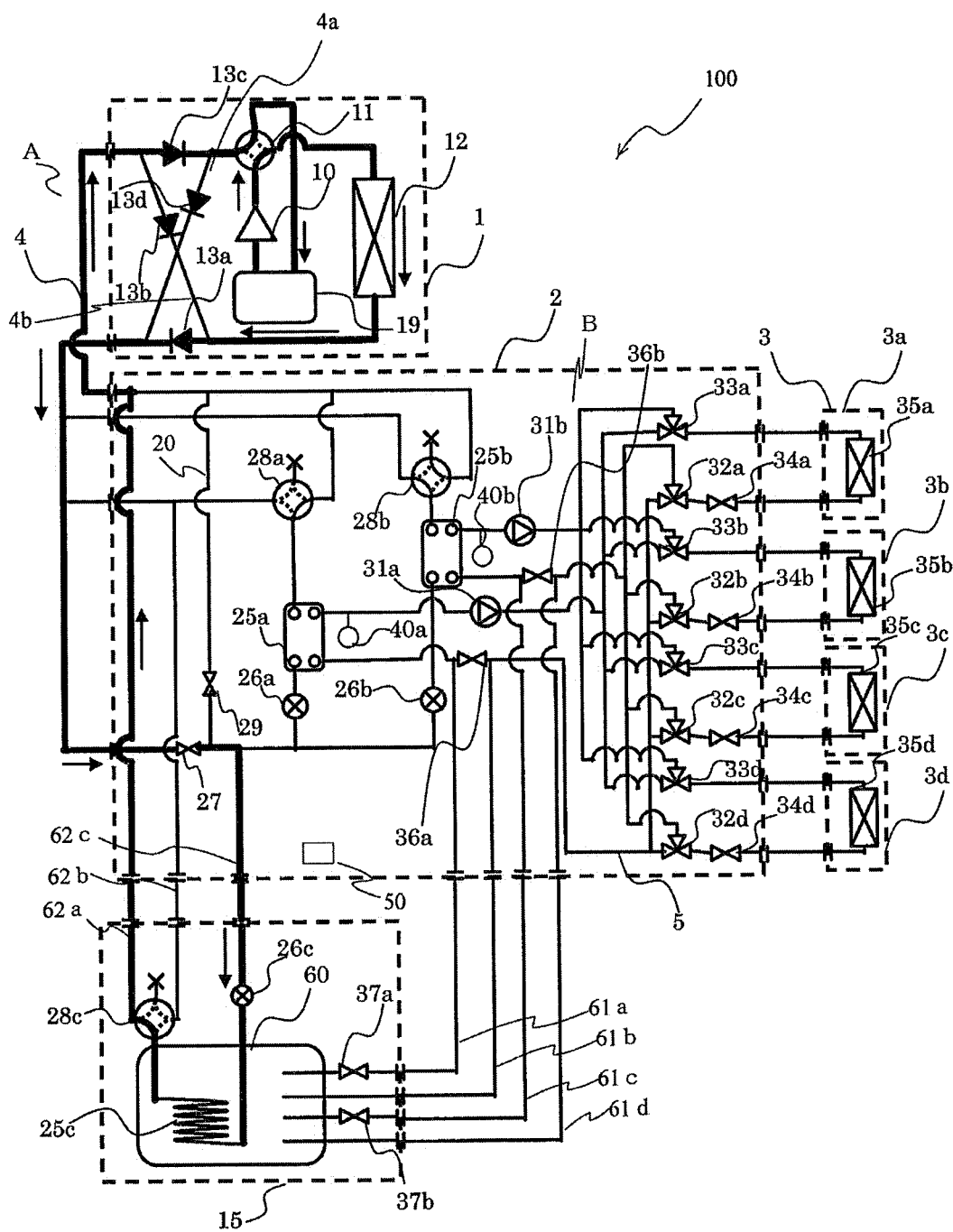
FIG. 5 is a refrigerant circuit diagram illustrating the flow of the refrigerant when the air-conditioning apparatus illustrated in FIG. 2 is in a cooling energy storing mode.

FIG. 5 is a refrigerant circuit diagram illustrating the flow of the refrigerant when the air-conditioning apparatus 100 illustrated in FIG. 2 is in the cooling energy storing mode. FIG. 5 illustrates an exemplary case of the cooling energy storing mode where the four indoor units 3a to 3d are in the stop mode. When the temperatures in the indoor spaces 7 have reached respective preset temperatures, the air-conditioning apparatus 100 changes the mode to the stop mode and stops the supply of the heat medium from the pumps 31a and 31b to the four use-side heat exchangers 35a to 35d. Furthermore, since the operation is in the stop mode, the operation of the fans provided to the four respective use-side heat exchangers 35 is stopped.

In FIG. 5, pipes through which the heat-source-side refrigerant flows are represented by bold lines, and the direction in which the heat-source-side refrigerant flows is represented by solid-line arrows.

In the cooling energy storing mode (stop mode), the first refrigerant flow switching device 11 included in the outdoor unit 1 is switched in such a manner as to allow the heat-source-side refrigerant that has been discharged from the compressor 10 to flow into the heat-source-side heat exchanger 12.

In the relay unit 2, since the four indoor units 3 are in the stop mode, the four first heat medium flow switching devices 32a to 32d, the four second heat medium flow switching devices 33a to 33d, and the four heat medium flow control devices 34a to 34d are closed. Furthermore, the opening and closing device 27 is open, the opening and closing device 29 is closed, and the first expansion device 26a and the first expansion device 26b are closed.

The operation of the pumps 31, the opening and closing of the heat medium passage opening and closing devices 36, and the switching of the second refrigerant flow switching devices 28 are arbitrary.

In the heat medium energy storage tank device 15, the third refrigerant flow switching device 28c is switched in such a manner as to connect the refrigerant pipe 62a and the intra-energy-storage-tank heat exchanger 25c to each other. The heat medium passage opening and closing device 37a and the heat medium passage opening and closing device 37b are not necessarily opened or closed.

First, the flow of the heat-source-side refrigerant in the refrigerant circuit A will be described.

A low-temperature, low-pressure refrigerant is compressed by the compressor 10 and is discharged from the compressor 10 in the form of a high-temperature, high-pressure gas refrigerant. The high-temperature, high-pressure gas refrigerant that has been discharged from the compressor 10 flows through the first refrigerant flow switching device 11 into the heat-source-side heat exchanger 12, where the refrigerant exchanges heat with the outside air, thereby turning into a high-temperature, high-pressure liquid or two-phase refrigerant. Then, the high-temperature, high-pressure liquid or two-phase refrigerant flows through the check valve 13a and flows out of the outdoor unit 1. The high-temperature, high-pressure liquid or two-phase refrigerant that has flowed out of the outdoor unit 1 flows through the refrigerant pipe 4 into the relay unit 2. The high-temperature, high-pressure liquid or two-phase refrigerant that has flowed into the relay unit 2 flows through the opening and closing device 27 into the heat medium energy storage tank device 15. The high-temperature, high-pressure liquid or two-phase refrigerant that has flowed into the heat medium energy storage tank device 15 is expanded by the second expansion device 26c, thereby turning into a low-temperature, low-pressure two-phase refrigerant. Then, the low-temperature, low-pressure two-phase refrigerant flows into the intra-energy-storage-tank heat exchanger 25c.

The two-phase refrigerant that has flowed into the intra-energy-storage-tank heat exchanger 25c receives heat from the heat medium in the heat medium energy storage tank 60, thereby being evaporated and gasified into a low-temperature gas refrigerant. The gas refrigerant flows through the third refrigerant flow switching device 28c and the refrigerant pipe 4, and flows into the outdoor unit 1 again. The refrigerant that has flowed into the outdoor unit 1 flows through the check valve 13c, the first refrigerant flow switching device 11, and the accumulator 19 and is sucked into the compressor 10 again.

In this case, the opening degree of the second expansion device 26c is controlled such that the value of superheat (the degree of superheat) obtained as the difference between a value obtained by a conversion of the pressure of the heat-source-side refrigerant flowing between the intra-energy-storage-tank heat exchanger 25c and the second expansion device 26c into a saturated temperature and the temperature of the heat-source-side refrigerant on the exit side of the intra-energy-storage-tank heat exchanger 25c becomes constant. If the temperature at an intermediate position of the intra-energy-storage-tank heat exchanger 25c is measurable, the temperature at the intermediate position may be used instead of the saturated temperature obtained by the conversion. In that case, no pressure sensors are necessary, and the system is inexpensively formed.

The heat medium in the heat medium circuit B will now be described.

The heat medium in the heat medium energy storage tank 60 receives cooling energy from the heat-source-side refrigerant that is supplied to the intra-energy-storage-tank heat exchanger 25c. That is, the heat medium in the heat medium energy storage tank 60 is stored with cooling energy in the cooling energy storing mode (stop mode). More specifically, the cooling energy storing mode (stop mode) is an operation mode in which the heat medium that is stored in the heat medium energy storage tank 60 is precooled in preparation for restart of operations on the indoor units 3.

[Cooling Energy Storing Mode (Freezing Easing Mode)]

Referring to FIG. 5, another cooling energy storing mode as a freezing easing mode will now be described. In the cooling energy storing mode (stop mode), at least a portion of the heat medium in the heat medium pipes 5 connecting the second heat medium flow switching devices 33, the use-side heat exchangers 35, and the first heat medium flow switching devices 32 is not in circulation. Therefore, if the temperature of the outside air is low, the portion of the heat medium in those heat medium pipes 5 may be frozen. Hence, in the cooling energy storing mode (freezing easing mode), the pumps 31a and 31b are driven, and the first heat medium flow switching devices 32, the second heat medium flow switching devices 33, and the heat medium flow control devices 34 are opened, whereby the portion of the heat medium in the above heat medium pipes 5 is made to circulate. As in the cooling energy storing mode (stop mode), the fans provided to the four respective use-side heat exchangers 35a to 35d are not in operation.

In the cooling energy storing mode illustrated in FIG. 5, the first refrigerant flow switching device 11 included in the outdoor unit 1 is switched in such a manner as to allow the heat-source-side refrigerant that has been discharged from the compressor 10 to flow into the heat-source-side heat exchanger 12.

In the relay unit 2, the pump 31a and the pump 31b are driven, and the heat medium flow control devices 34a to 34d are opened. Furthermore, the three connection ports of each of the second heat medium flow switching devices 33a to 33d are open so as to allow the heat medium that is supplied from the pump 31a and the pump 31b to flow into the use-side heat exchangers 35a to 35d. Furthermore, the three connection ports of each of the first heat medium flow switching devices 32a to 32d are open so as to allow the heat medium that is sent from the heat medium flow control devices 34a to 34d to flow into the heat medium pipes 61b and 61d. Thus, the heat medium circulates between each of the intermediate heat exchanger 25a and the intermediate heat exchanger 25b and the use-side heat exchangers 35a to 35d.

The heat medium passage opening and closing device 36a and the heat medium passage opening and closing device 36b are closed. Hence, the heat medium that is transported by the pump 31a and the pump 31b circulates the heat medium energy storage tank device 15.

In the heat medium energy storage tank device 15, the heat medium passage opening and closing device 37a and the heat medium passage opening and closing device 37b are open.

The flow of the heat-source-side refrigerant in the refrigerant circuit A is the same as that described in [Cooling Energy Storing Mode (Stop Mode)], and description thereof is omitted. The flow of the heat medium in the heat medium circuit B will now be described.

In the cooling energy storing mode (freezing easing mode), the heating energy of the heat medium is transferred to the heat-source-side refrigerant in the intra-energy-storage-tank heat exchanger 25c, and the heat medium thus cooled is made to flow through the heat medium pipes 5 by the pump 31a and the pump 31b. The heat medium that has been pressurized by and discharged from the pump 31a and the pump 31b flows through the second heat medium flow switching devices 33a to 33d into the use-side heat exchangers 35a to 35d. Meanwhile, the fans provided to the respective use-side heat exchangers 35a to 35d are not in operation. Hence, no cooled air is supplied from the indoor units 3 to the rooms.

Subsequently, the heat medium flows out of the use-side heat exchangers 35a to 35d and flows into the heat medium flow control devices 34a to 34d. In this state, the heat medium flow control devices 34a to 34d are fully open, whereby the heat medium circulates through the heat medium circuit at the maximum flow rate. The heat medium that has flowed out of the heat medium flow control devices 34a to 34d flows through the first heat medium flow switching devices 32a to 32d into the heat medium pipes 61b and 61d. Then, the heat medium that has flowed into the heat medium pipes 61b and 61d flows into the heat medium energy storage tank device 15. The heat medium that has flowed into the heat medium energy storage tank device 15 flows into the heat medium energy storage tank 60.

A portion of the heat medium in the heat medium energy storage tank 60 flows through the heat medium pipe 61a into the relay unit 2, and then flows into the intermediate heat exchanger 25a. The other portion of the heat medium in the heat medium energy storage tank 60 flows through the heat medium pipe 61c into the relay unit 2, and then flows into the intermediate heat exchanger 25b. The portion of the heat medium that has flowed into the intermediate heat exchanger 25a is sucked into the pump 31a again. The portion of the heat medium that has flowed into the intermediate heat exchanger 25b is sucked into the pump 31b again.

In the cooling energy storing mode (freezing easing mode), the pumps 31a and 31b are driven. That is, the heat medium is made to flow through the heat medium pipes 5. Furthermore, the heat medium in the heat medium energy storage tank 60 receives cooling energy from the heat-source-side refrigerant that is supplied to the intra-energy-storage-tank heat exchanger 25c. Thus, in the air-conditioning apparatus 100, not only because the cooling energy is storable in the heat medium but also because the heat medium is made to flow through the heat medium pipes 5 by the pumps 31a and 31b, freezing of the heat medium in the heat medium pipes 5 is suppressed.

[Stored Cooling Energy Transfer Mode]

Figure 6:
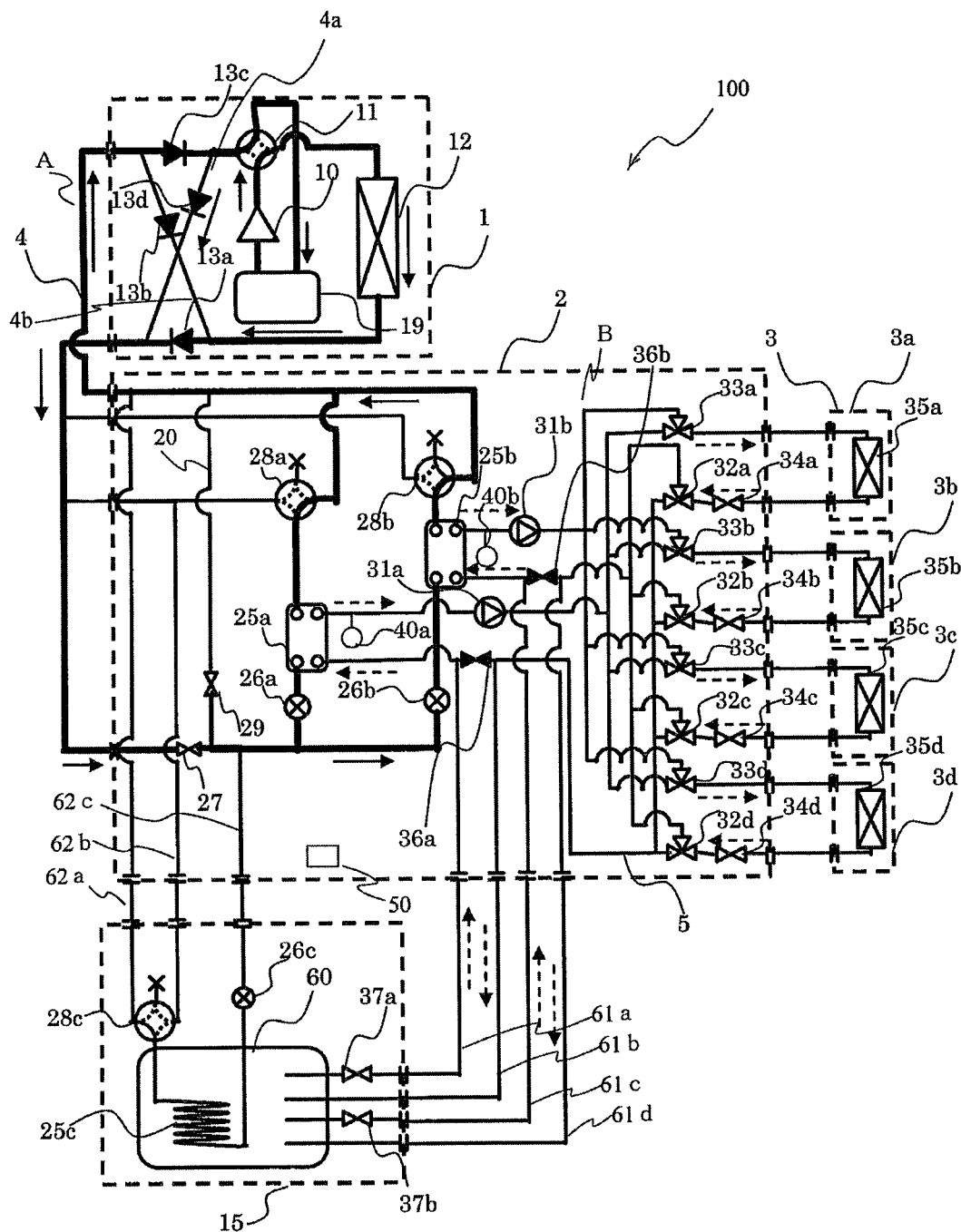
FIG. 6 is a refrigerant circuit diagram illustrating the flow of the refrigerant when the air-conditioning apparatus illustrated in FIG. 2 is in a stored cooling energy transfer mode.

FIG. 6 is a refrigerant circuit diagram illustrating the flow of the refrigerant when the air-conditioning apparatus 100 illustrated in FIG. 2 is in the stored cooling energy transfer mode. In FIG. 6, pipes through which the heat-source-side refrigerant flows are represented by bold lines, the direction in which the heat-source-side refrigerant flows is represented by solid-line arrows, and the direction in which the heat medium flows is represented by broken-line arrows. In FIG. 6, the four use-side heat exchangers 35a to 35d all have cooling loads. That is, the four indoor units 3a to 3d are all performing cooling operations.

In the stored cooling energy transfer mode illustrated in FIG. 6, the first refrigerant flow switching device 11 included in the outdoor unit 1 is switched in such a manner as to allow the heat-source-side refrigerant that has been discharged from the compressor 10 to flow into the heat-source-side heat exchanger 12.

In the relay unit 2, the pump 31a and the pump 31b are driven, and the heat medium flow control devices 34a to 34d are opened, whereby the heat medium circulates between each of the intermediate heat exchanger 25a and the intermediate heat exchanger 25b and the use-side heat exchangers 35a to 35d. Furthermore, the heat medium passage opening and closing device 36a and the heat medium passage opening and closing device 36b are closed, whereby the heat medium that is transported by the pump 31a and the pump 31b circulates the heat medium energy storage tank device 15. The second refrigerant flow switching device 28a and the second refrigerant flow switching device 28b are switched to the cooling side, the opening and closing device 27 is open, and the opening and closing device 29 is closed. Furthermore, in the heat medium energy storage tank device 15, the third refrigerant flow switching device 28c is switched to the cooling side, and the second expansion device 26c is fully closed. Furthermore, the heat medium passage opening and closing device 37a and the heat medium passage opening and closing device 37b are opened.

The flow of the heat-source-side refrigerant in the refrigerant circuit A in the stored cooling energy transfer mode illustrated in FIG. 6 is the same as that in the cooling only operation mode. A high-temperature, high-pressure gas refrigerant that has been discharged from the compressor 10 flows through the first refrigerant flow switching device 11 into the heat-source-side heat exchanger 12, where the refrigerant exchanges heat with the outside air, thereby turning into a high-temperature, high-pressure liquid or two-phase refrigerant. Then, the high-temperature, high-pressure liquid or two-phase refrigerant flows through the check valve 13a and flows out of the outdoor unit 1. The high-temperature, high-pressure liquid or two-phase refrigerant that has flowed out of the outdoor unit 1 flows through the refrigerant pipe 4 into the relay unit 2. The high-temperature, high-pressure liquid or two-phase refrigerant that has flowed into the relay unit 2 flows through the opening and closing device 27, is expanded by the first expansion devices 26, turns into a low-temperature, low-pressure two-phase refrigerant, and flows into the intermediate heat exchangers 25. The two-phase refrigerant that has flowed into the intermediate heat exchangers 25 receives heat from the heat medium, thereby being evaporated and gasified into a low-temperature gas refrigerant. The gas refrigerant flows through the second refrigerant flow switching devices 28 and the refrigerant pipe 4, and flows into the outdoor unit 1 again. The refrigerant that has flowed into the outdoor unit 1 flows through the check valve 13c, the first refrigerant flow switching device 11, and the accumulator 19 and is sucked into the compressor 10 again.

The flow of the heat medium in the heat medium circuit B will now be described.

In the stored cooling energy transfer mode, the heat medium that has been cooled in the cooling energy storing mode is made to flow through the heat medium pipes 5. That is, in the cooling energy storing mode, the heat medium stores the cooling energy transferred thereto from the heat-source-side refrigerant that is supplied to the intra-energy-storage-tank heat exchanger 25c, and is made to flow through the heat medium pipes 5 by the pump 31a and the pump 31b. Therefore, the heat medium that has been pressurized by and discharged from the pump 31a and the pump 31b flows through the second heat medium flow switching devices 33a to 33d into the use-side heat exchangers 35a to 35d. Then, the heat medium transfers its heat to the indoor air in the use-side heat exchangers 35a to 35d, whereby the indoor spaces 7 are cooled.

Subsequently, the heat medium flows out of the use-side heat exchangers 35a to 35d and flows into the heat medium flow control devices 34a to 34d. In this state, the heat medium flow control devices 34a to 34d control the heat medium to flow into the use-side heat exchangers 35a to 35d at respective flow rates required for handling the air-conditioning loads required in the respective rooms. The heat medium that has flowed out of the heat medium flow control devices 34a to 34d flows through the first heat medium flow switching devices 32a to 32d, branched, and is directed to the heat medium energy storage tank device 15. The heat medium that has flowed into the heat medium energy storage tank device 15 is mixed with the heat medium in the heat medium energy storage tank 60, flows through the heat medium passage opening and closing device 37a and the heat medium passage opening and closing device 37b, flows into the relay unit 2 again, further flows into and through the intermediate heat exchanger 25a and the intermediate heat exchanger 25b, and is sucked into the pump 31a and the pump 31b again.

Since the air-conditioning apparatus 100 according to Embodiment has the cooling energy storing mode (stop mode), the heat medium that is stored in the heat medium energy storage tank 60 is precoolable (storable with cooling energy) in preparation for restart of operations on the indoor units 3. In restarting cooling operations, since the stored cooling energy transfer mode is executed, the heat medium that has been stored with cooling energy is transported to the use-side heat exchangers 35. Therefore, the start-up time taken for the cooling operations is reduced.

[Continuous Cooling Operation and Energy Storing Mode]

Figure 7:
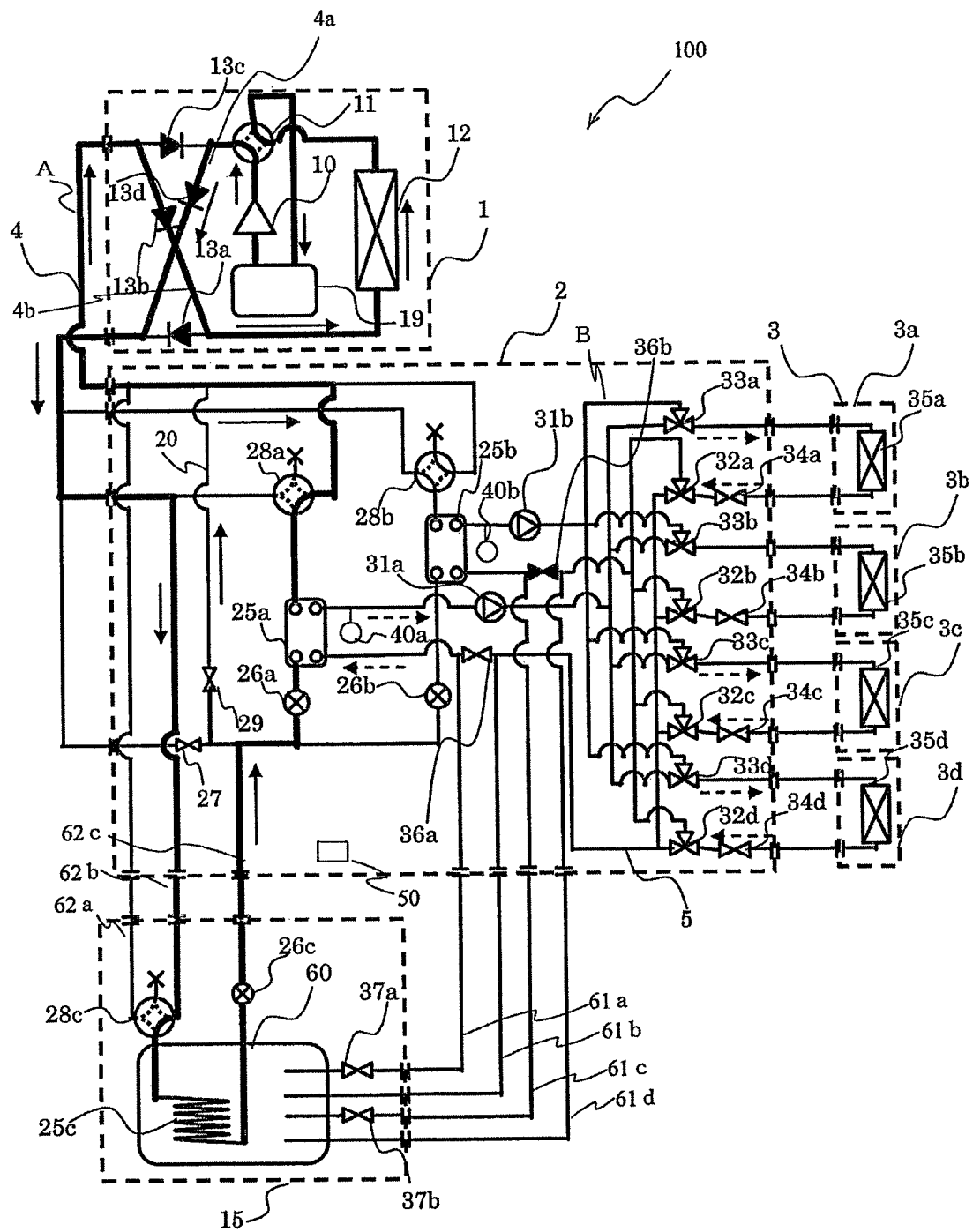
FIG. 7 is a refrigerant circuit diagram illustrating the flow of the refrigerant when the air-conditioning apparatus illustrated in FIG. 2 is in a continuous cooling operation and energy storing mode.

FIG. 7 is a refrigerant circuit diagram illustrating the flow of the refrigerant when the air-conditioning apparatus 100 illustrated in FIG. 2 is in the continuous cooling operation and energy storing mode. In the continuous cooling operation and energy storing mode, any of the four use-side heat exchangers 35a to 35d have cooling energy loads. FIG. 7 illustrates an exemplary case where the use-side heat exchangers 35a, 35c, and 35d have cooling energy loads. Hence, the pump 31a and the fans provided to the use-side heat exchangers 35a, 35c, and 35d are in operation. In FIG. 7, pipes through which the heat-source-side refrigerant flows are represented by bold lines, the direction in which the heat-source-side refrigerant flows is represented by solid-line arrows, and the direction in which the heat medium flows is represented by broken-line arrows.

In the continuous cooling operation and energy storing mode, the first refrigerant flow switching device 11 included in the outdoor unit 1 is switched in such a manner as to allow the heat-source-side refrigerant that has been discharged from the compressor 10 to flow into the relay unit 2 without flowing through the heat-source-side heat exchanger 12.

In the relay unit 2, the pump 31a is driven, and the heat medium flow control devices 34a, 34c, and 34d are opened. Furthermore, the second heat medium flow switching devices 33a, 33c, and 33d are switched in such a manner as to allow the heat medium that is supplied from the pump 31a to flow into the use-side heat exchangers 35a, 35c, and 35d. Furthermore, the first heat medium flow switching devices 32a, 32c, and 32d are switched in such a manner as to allow the heat medium that is sent from the heat medium flow control devices 34a, 34c, and 34d to flow into the intermediate heat exchanger 25a. Thus, the heat medium circulates between the intermediate heat exchanger 25a and the use-side heat exchangers 35a, 35c, and 35d.

Furthermore, the heat medium passage opening and closing device 36a is open, the second heat medium flow switching device 33b is closed, and the first heat medium flow switching device 32b is closed.

Furthermore, the second refrigerant flow switching device 28a is switched to the cooling side, the opening and closing device 27 is closed, the opening and closing device 29 is closed, and the first expansion device 26b is closed. The heat medium passage opening and closing device 36b may be open or closed.

In the heat medium energy storage tank device 15, the third refrigerant flow switching device 28c is switched in such a manner as to be connected to the refrigerant pipe 62b on one side thereof and to the intra-energy-storage-tank heat exchanger 25c on the other side thereof. Furthermore, the heat medium passage opening and closing device 37a is closed. The heat medium passage opening and closing device 37b may be open or closed.

First, the flow of the heat-source-side refrigerant in the refrigerant circuit A will be described.

A low-temperature, low-pressure refrigerant is compressed by the compressor 10 and is discharged from the compressor 10 in the form of a high-temperature, high-pressure gas refrigerant. The high-temperature, high-pressure gas refrigerant that has been discharged from the compressor 10 flows through the first refrigerant flow switching device 11 and the first connection pipe 4a and flows out of the outdoor unit 1. The high-temperature, high-pressure gas refrigerant that has flowed out of the outdoor unit 1 flows through the refrigerant pipe 4 into the relay unit 2. The high-temperature, high-pressure gas refrigerant that has flowed into the relay unit 2 flows through the refrigerant pipe 62b into the heat medium energy storage tank device 15. The high-temperature, high-pressure gas refrigerant that has flowed into the heat medium energy storage tank device 15 flows through the third refrigerant flow switching device 28c into the intra-energy-storage-tank heat exchanger 25c that is functioning as a condenser.

The gas refrigerant that has flowed into the intra-energy-storage-tank heat exchanger 25c transfers its heat to the heat medium in the heat medium energy storage tank 60, thereby being condensed and liquefied into a liquid refrigerant. The liquid refrigerant that has flowed out of the intra-energy-storage-tank heat exchanger 25c is expanded by the second expansion device 26c, thereby turning into a low-pressure two-phase refrigerant. The low-pressure two-phase refrigerant flows from the second expansion device 26c through the refrigerant pipe 62c into the relay unit 2. The low-pressure two-phase refrigerant that has flowed into the relay unit 2 flows through the first expansion device 26a into the intermediate heat exchanger 25a that is functioning as an evaporator. The low-pressure two-phase refrigerant that has flowed into the intermediate heat exchanger 25a evaporates by receiving heat from the heat medium that is circulating through the heat medium circuit B, thereby cooling the heat medium. The low-temperature, low-pressure two-phase refrigerant that has flowed out of the intermediate heat exchanger 25a flows through the second refrigerant flow switching device 28a and flows out of the relay unit 2. The low-temperature, low-pressure two-phase refrigerant that has flowed out of the relay unit 2 flows through the refrigerant pipe 4 and flows into the outdoor unit 1 again.

The low-temperature, low-pressure two-phase refrigerant that has flowed into the outdoor unit 1 flows through the second connection pipe 4b into the heat-source-side heat exchanger 12 that is functioning as an evaporator. The refrigerant that has flowed into the heat-source-side heat exchanger 12 receives heat from the outside air in the heat-source-side heat exchanger 12, thereby turning into a low-temperature, low-pressure gas refrigerant. The low-temperature, low-pressure gas refrigerant that has flowed out of the heat-source-side heat exchanger 12 flows through the first refrigerant flow switching device 11 and the accumulator 19 and is sucked into the compressor 10 again.

The opening degree of the second expansion device 26c of the heat medium energy storage tank device 15 is controlled such that the value of subcooling (the degree of subcooling) of the refrigerant at the exit of the intra-energy-storage-tank heat exchanger 25c becomes a target value. Alternatively, the value of subcooling may be controlled by using the first expansion device 26a with the second expansion device 26c fully open.

The flow of the heat medium in the heat medium circuit B will now be described.

First, a portion of the heat medium that is not used for the cooling operation will be described. Since the pump 31b is not in operation and the heat medium passage opening and closing device 37a is closed, no heat medium is supplied to the heat medium energy storage tank 60 from the heat medium pipes 61b and 61d. The heat medium in the heat medium energy storage tank 60 receives heating energy from the heat-source-side refrigerant that is supplied to the intra-energy-storage-tank heat exchanger 25c. That is, the heat medium in the heat medium energy storage tank 60 can store heating energy in the continuous cooling operation and energy storing mode.

The flow of a portion of the heat medium that is used for the cooling operation will now be described. In the continuous cooling operation and energy storing mode, the cooling energy of the heat-source-side refrigerant is transferred to the heat medium in the intermediate heat exchanger 25a, and the heat medium thus cooled is made to flow through the heat medium pipes 5 by the pump 31a. The heat medium that has been discharged from the pump 31a flows through the second heat medium flow switching devices 33a, 33b, and 33d into the use-side heat exchangers 35a, 35b, and 35d having cooling energy loads.

In each of the use-side heat exchangers 35a, 35c, and 35d, the heat medium receives heat from the indoor air, whereby an operation of cooling a corresponding one of the indoor spaces 7 is performed. That is, in this state, the heat medium flow control devices 34a, 34c, and 34d control the heat medium to flow into the use-side heat exchangers 35a, 35c, and 35d at respective flow rates required for handling the air-conditioning loads required in the respective rooms. The heat medium that has been used for the cooling operation and has flowed through the use-side heat exchangers 35a, 35c, and 35d with the temperature thereof having risen slightly flows through the heat medium flow control devices 34a, 34c, and 34d and the first heat medium flow switching devices 32a, 32c, and 32d into the intermediate heat exchanger 25a, and is sucked into the pump 31a again.

As described above, during a period from when the heat medium is discharged from the pump 31a until the heat medium is sucked into the pump 31a again, the first heat medium flow switching device 32b and the second heat medium flow switching device 33b are closed while the first heat medium flow switching devices 32a, 32c, and 32d and the second heat medium flow switching devices 33a, 33c, and 33d are switched in such a manner as to allow the heat medium that is to be used for cooling to be supplied to the use-side heat exchangers 35a, 35c, and 35d. Thus, while cooling operations are performed on the indoor units 3a, 3c, and 3d, the heat medium in the heat medium energy storage tank 60 is storable with heating energy.

The air-conditioning loads required in the indoor spaces 7 are handleable by controlling the difference between the temperature of the heat medium that has flowed out of the use-side heat exchangers 35a, 35c, and 35d and the temperature detected by the temperature sensor 40a to be maintained at a target value.

[Continuous Heating Operation and Energy Storing Mode]

Figure 8:
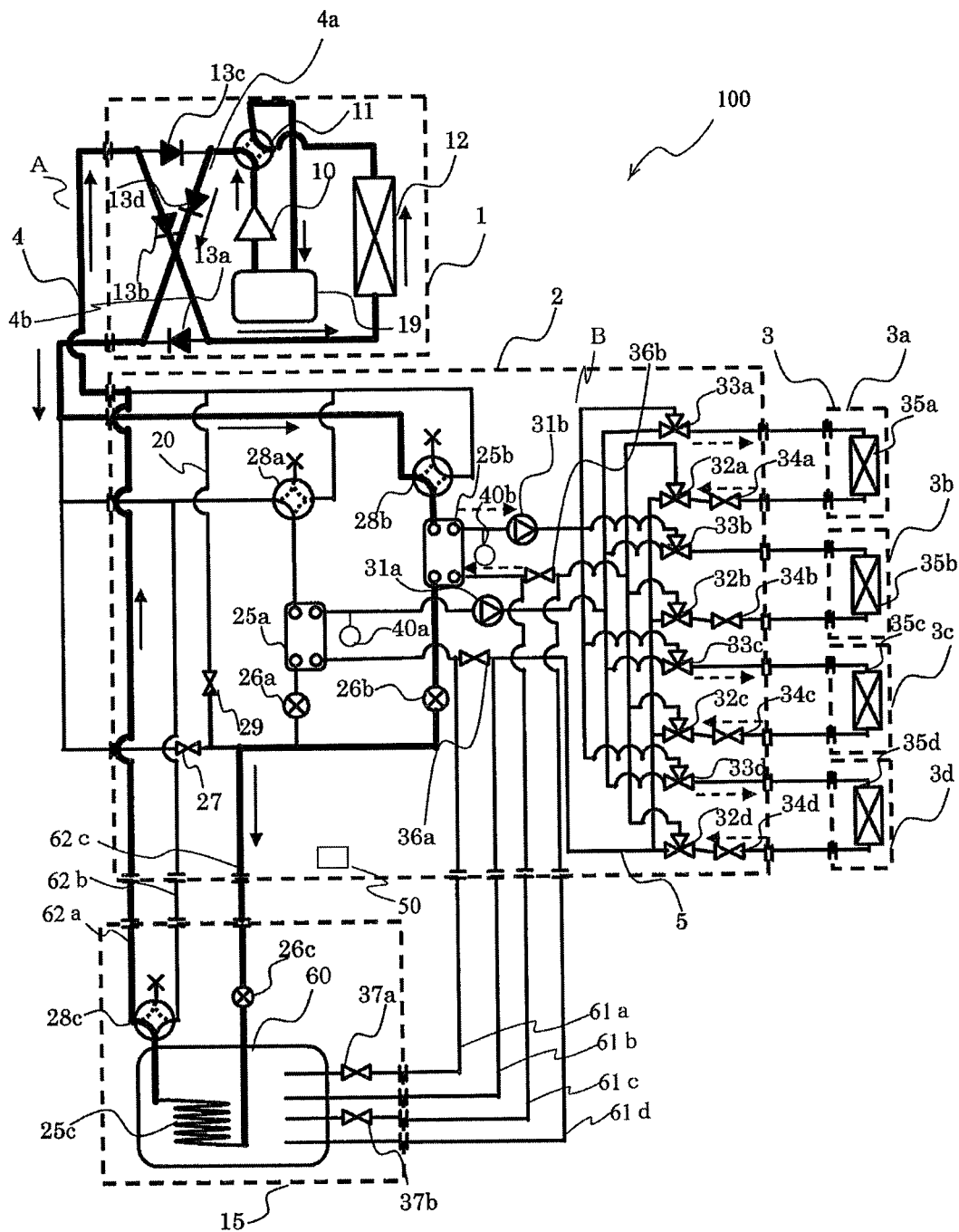
FIG. 8 is a refrigerant circuit diagram illustrating the flow of the refrigerant when the air-conditioning apparatus illustrated in FIG. 2 is in a continuous heating operation and energy storing mode.

FIG. 8 is a refrigerant circuit diagram illustrating the flow of the refrigerant when the air-conditioning apparatus 100 illustrated in FIG. 2 is in the continuous heating operation and energy storing mode. In the continuous heating operation and energy storing mode, any of the four use-side heat exchangers 35a to 35d have heating energy loads. FIG. 8 illustrates an exemplary case where the use-side heat exchangers 35a, 35c, and 35d have heating energy loads. Hence, the pump 31a and the fans provided to the use-side heat exchangers 35a, 35c, and 35d are in operation. In FIG. 8, pipes through which the heat-source-side refrigerant flows are represented by bold lines, the direction in which the heat-source-side refrigerant flows is represented by solid-line arrows, and the direction in which the heat medium flows is represented by broken-line arrows.

In the continuous heating operation and energy storing mode, the first refrigerant flow switching device 11 included in the outdoor unit 1 is switched in such a manner as to allow the heat-source-side refrigerant that has been discharged from the compressor 10 to flow into the relay unit 2 without flowing through the heat-source-side heat exchanger 12.

In the relay unit 2, the pump 31b is driven, and the heat medium flow control devices 34a, 34c, and 34d are opened. Furthermore, the second heat medium flow switching devices 33a, 33c, and 33d are switched in such a manner as to allow the heat medium that is supplied from the pump 31b to flow into the use-side heat exchangers 35a, 35c, and 35d. Furthermore, the first heat medium flow switching devices 32a, 32c, and 32d are switched in such a manner as to allow the heat medium that is sent from the heat medium flow control devices 34a, 34c, and 34d to flow into the intermediate heat exchanger 25b. Thus, the heat medium circulates between the intermediate heat exchanger 25b and the use-side heat exchangers 35a, 35c, and 35d.

Furthermore, the heat medium passage opening and closing device 36b is open, the second heat medium flow switching device 33*b* is closed, and the first heat medium flow switching device 32*b* is closed.

Furthermore, the second refrigerant flow switching device 28*b* is switched to the heating side, and the opening and closing device 27, the opening and closing device 29, and the first expansion device 26*a* are closed. The heat medium passage opening and closing device 36*a* may be open or closed.

In the heat medium energy storage tank device 15, the third refrigerant flow switching device 28*c* is switched in such a manner as to be connected to the refrigerant pipe 62*a* on one side thereof and to the intra-energy-storage-tank heat exchanger 25*c* on the other side thereof. Furthermore, the heat medium passage opening and closing device 37*b* is closed. The heat medium passage opening and closing device 37*a* may be open or closed.

First, the flow of the heat-source-side refrigerant in the refrigerant circuit A will be described.

A low-temperature, low-pressure refrigerant is compressed by the compressor 10 and is discharged from the compressor 10 in the form of a high-temperature, high-pressure gas refrigerant. The high-temperature, high-pressure gas refrigerant that has been discharged from the compressor 10 flows through the first refrigerant flow switching device 11 and the first connection pipe 4*a* and flows out of the outdoor unit 1. The high-temperature, high-pressure gas refrigerant that has flowed out of the outdoor unit 1 flows through the refrigerant pipe 4 into the relay unit 2. The high-temperature, high-pressure gas refrigerant that has flowed into the relay unit 2 flows through the second refrigerant flow switching device 28*b* into the intermediate heat exchanger 25*b* that is functioning as a condenser.

The gas refrigerant that has flowed into the intermediate heat exchanger 25*b* transfers its heat to the heat medium that is circulating through the heat medium circuit B, whereby the gas refrigerant is condensed and liquefied into a liquid refrigerant. The liquid refrigerant that has flowed out of the intermediate heat exchanger 25*b* is expanded by the first expansion device 26*b*, thereby turning into a low-pressure two-phase refrigerant. The low-pressure two-phase refrigerant flows from the first expansion device 26*b* through the refrigerant pipe 62*c* into the heat medium energy storage tank device 15. The low-pressure two-phase refrigerant that has flowed into the heat medium energy storage tank device 15 flows through the second expansion device 26*c* into the intra-energy-storage-tank heat exchanger 25*c* that is functioning as an evaporator.

The low-pressure two-phase refrigerant that has flowed into the intra-energy-storage-tank heat exchanger 25*c* receives heat from the heat medium that is circulating through the heat medium circuit B, whereby the low-pressure two-phase refrigerant is evaporated and gasified. The low-pressure two-phase refrigerant that has flowed out of the intra-energy-storage-tank heat exchanger 25*c* flows through the third refrigerant flow switching device 28*c* and the refrigerant pipe 62*a* into the relay unit 2. The low-pressure two-phase refrigerant that has flowed into the relay unit 2 flows through the refrigerant pipe 4 and flows into the outdoor unit 1 again.

The low-pressure two-phase refrigerant that has flowed into the outdoor unit 1 flows through the second connection pipe 4*b* into the heat-source-side heat exchanger 12 that is functioning as an evaporator. The refrigerant that has flowed into the heat-source-side heat exchanger 12 receives heat from the outside air in the heat-source-side heat exchanger 12, thereby turning into a low-temperature, low-pressure gas refrigerant. The low-temperature, low-pressure gas refrigerant that has flowed out of the heat-source-side heat exchanger 12 flows through the first refrigerant flow switching device 11 and the accumulator 19 and is sucked into the compressor 10 again.

The opening degree of the first expansion device 26*b* in the relay unit 2 is controlled such that the value of subcooling (the degree of subcooling) of the refrigerant at the exit of the intermediate heat exchanger 25*b* becomes a target value. Alternatively, the value of subcooling may be controlled by using the second expansion device 26*c* with the first expansion device 26*b* fully open.

The flow of the heat medium in the heat medium circuit B will now be described.

First, a portion of the heat medium that is not used for the heating operation will be described. Since the pump 31*a* is not in operation and the heat medium passage opening and closing device 37*b* is closed, no heat medium is supplied to the heat medium energy storage tank 60 from the heat medium pipes 61*b* and 61*d*. The heat medium in the heat medium energy storage tank 60 receives cooling energy from the heat-source-side refrigerant that is supplied to the intra-energy-storage-tank heat exchanger 25*c*. That is, the heat medium in the heat medium energy storage tank 60 can store energy in the continuous heating operation and energy storing mode.

The flow of a portion of the heat medium that is used for the heating operation will now be described. In the continuous heating operation and energy storing mode, the heating energy of the heat-source-side refrigerant is transferred to the heat medium in the intermediate heat exchanger 25*b*, and the heat medium thus heated is made to flow through the heat medium pipes 5 by the pump 31*b*. The heat medium that has been discharged from the pump 31*b* flows through the second heat medium flow switching devices 33*a*, 33*b*, and 33*d* into the use-side heat exchangers 35*a*, 35*b*, and 35*d* having heating energy loads.

In each of the use-side heat exchangers 35*a*, 35*c*, and 35*d*, the heat medium transfers its heat to the indoor air, whereby an operation of heating a corresponding one of the indoor spaces 7 is performed. That is, in this state, the heat medium flow control devices 34*a*, 34*c*, and 34*d* control the heat medium to flow into the use-side heat exchangers 35*a*, 35*c*, and 35*d* at respective flow rates required for handling the air-conditioning loads required in the respective rooms. The heat medium that has been used for the heating operation and has flowed through the use-side heat exchangers 35*a*, 35*c*, and 35*d* with the temperature thereof having risen slightly flows through the heat medium flow control devices 34*a*, 34*c*, and 34*d* and the first heat medium flow switching devices 32*a*, 32*c*, and 32*d* into the intermediate heat exchanger 25*b*, and is sucked into the pump 31*b* again.

As described above, during a period from when the heat medium is discharged from the pump 31*b* until the heat medium is sucked into the pump 31*b* again, the first heat medium flow switching device 32*b* and the second heat medium flow switching device 33*b* are closed while the first heat medium flow switching devices 32*a*, 32*c*, and 32*d* and the second heat medium flow switching devices 33*a*, 33*c*, and 33*d* are switched in such a manner as to allow the heat medium that is to be used for cooling to be supplied to the use-side heat exchangers 35*a*, 35*c*, and 35*d*. Thus, while heating operations are performed on the indoor units 3*a*, 3*c*, and 3*d*, the heat medium in the heat medium energy storage tank 60 is cooled and storable with cooling energy.

The air-conditioning loads required in the indoor spaces 7 are handleable by controlling the difference between the temperature of the heat medium that has flowed out of the use-side heat exchangers 35*a*, 35*c*, and 35*d* and the temperature detected by the temperature sensor 40*b* to be maintained at a target value.

[Relationship Between Total Volume of Heat Medium and Change in Temperature]

Figure 9:
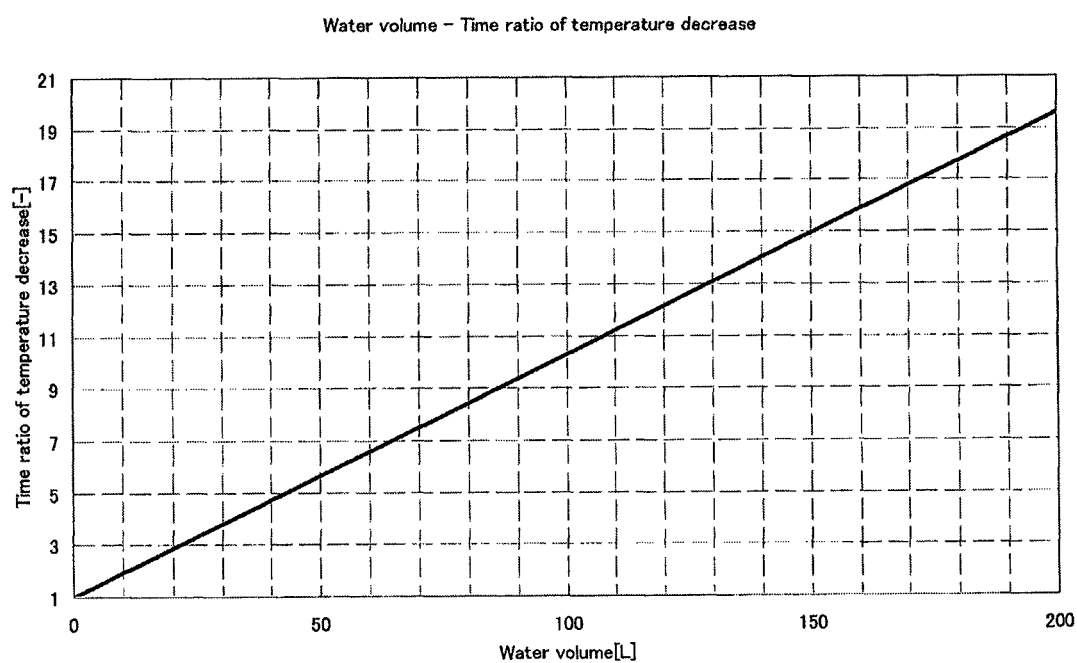
FIG. 9 is a graph illustrating the time taken for the temperature of the heat medium to drop to a predetermined temperature in relation to the increase in the total volume of heat medium in an area excluding the relay unit and the use-side heat exchangers.

FIG. 9 is a graph illustrating the time taken for the temperature of the heat medium to drop to a predetermined temperature in relation to the increase in the total volume of heat medium in an area excluding the relay unit 2 and the use-side heat exchangers 35. The horizontal axis in FIG. 9 represents the increment in the total volume of heat medium in the area excluding the relay unit 2 and the use-side heat exchangers 35. The vertical axis in FIG. 9 represents the ratio indicating the time taken for the temperature of the heat medium to drop to the predetermined temperature (the ratio of reaching time). Specifically, when the increment in the heat medium is 0 (L), the time taken for the temperature of the heat medium to drop to the predetermined temperature is defined as 1.

The predetermined temperature is an arbitrary value. That is, the graph in FIG. 9 illustrates an exemplary case where a certain temperature is set as the predetermined temperature. In the following description, the total volume of heat medium in the area excluding the relay unit 2 and the use-side heat exchangers 35 will be simply referred to as the total volume of heat medium.

As illustrated in FIG. 9, as the total volume of heat medium increases, the ratio of reaching time taken for the heat medium to reach the predetermined temperature increases, that is, the time taken for the heat medium to drop to the predetermined temperature becomes longer.

Hence, in the air-conditioning apparatus 100 according to Embodiment, items such as the heating capacity (including the rotation speed of the compressor 10) and the volume of heat medium in the heat medium energy storage tank 60 may be determined on the basis of the difference in the ratio of reaching time that changes correspondingly with the change in the total volume of heat medium as illustrated in FIG. 9.

Figure 10:
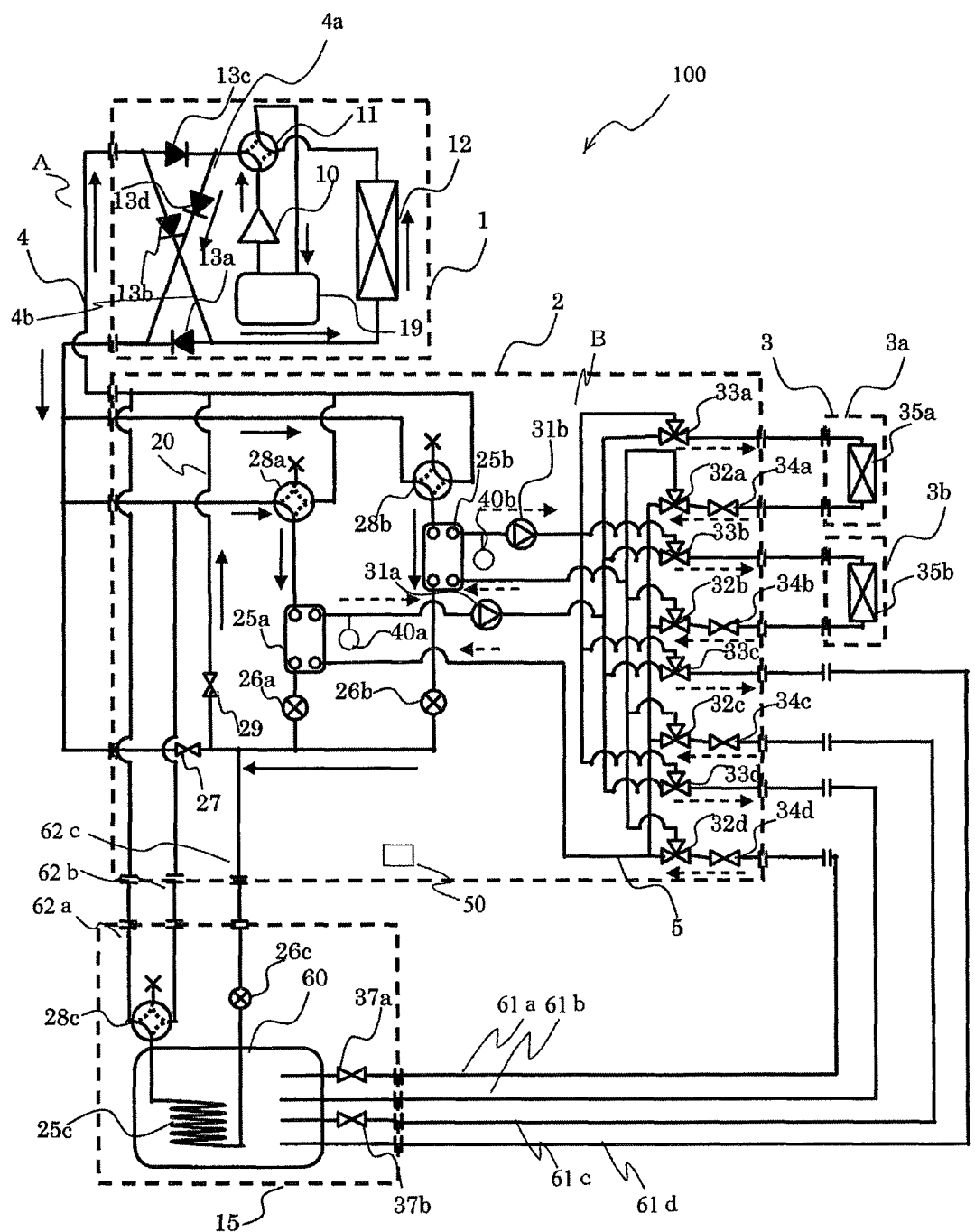
FIG. 10 is a refrigerant circuit diagram illustrating another example of the positions of connections of the heat medium energy storage tank to the heat medium pipes illustrated in FIG. 2.

FIG. 10 is a refrigerant circuit diagram illustrating the positions of connections of the heat medium energy storage tank 60 to the heat medium pipes 5 that are different from those illustrated in FIG. 2. While the heat medium energy storage tank device 15 included in the refrigerant circuit illustrated in FIG. 2 is connected to the heat medium pipes 5 provided before the entrances of the intermediate heat exchangers 25*a* and 25*b*, the heat medium energy storage tank device 15 may be connected to the heat medium pipes 5 that are connected to any two of the four use-side heat exchangers 35*a* to 35*d*. Here, as illustrated in FIG. 10, suppose that the use-side heat exchangers 35*c* and 35*d* are not provided. In this case, the heat medium pipe 61*a* is connected to the heat medium flow control device 34*d*, and the heat medium pipe 61*b* is connected to the second heat medium flow switching device 33*d*. Furthermore, the heat medium pipe 61*c* is connected to the heat medium flow control device 34*c*, and the heat medium pipe 61*d* is connected to the second heat medium flow switching device 33*c*. Even in such a configuration, the heating energy storing mode, the stored heating energy transfer mode, the cooling energy storing mode, the stored cooling energy transfer mode, the continuous cooling operation and energy storing mode, and the continuous heating operation and energy storing mode are available.

[Advantageous Effects Produced by Air-Conditioning Apparatus 100]

When the air-conditioning apparatus 100 according to Embodiment is in the heating energy storing mode, the heat medium that is stored in the heat medium energy storage tank 60 is preheatable (storable with heating energy) in preparation for restart of operations on the indoor units 3. In restarting heating operations, since the stored heating energy transfer mode is executed, the heat medium that has been stored with heating energy is transported to the use-side heat exchangers 35. Therefore, the start-up time taken for the heating operations is reduced.

When the air-conditioning apparatus 100 according to Embodiment is in the continuous heating operation and energy storing mode, the heat medium that is stored in the heat medium energy storage tank 60 is precoolable (storable with cooling energy) in preparation for restart of operations on the indoor units 3 while heating operations are performed on the indoor units 3. Therefore, the start-up time taken for switching the indoor units 3 from the heating operations to cooling operations is reduced.

When the air-conditioning apparatus 100 according to Embodiment is in the cooling energy storing mode (stop mode), the heat medium that is stored in the heat medium energy storage tank 60 is precoolable (storable with cooling energy) in preparation for restart of operations on the indoor units 3. In restarting cooling operations, since the stored cooling energy transfer mode is executed, the heat medium that has been stored with cooling energy is transported to the use-side heat exchangers 35. Therefore, the start-up time taken for the cooling operations and the time taken for switching from the cooling operations to heating operations are reduced.

When the air-conditioning apparatus 100 according to Embodiment is in the continuous cooling operation and energy storing mode, the heat medium stored in the heat medium energy storage tank 60 is preheatable (storable with heating energy) in preparation for restart of operations on the indoor units 3 while cooling operations are performed on the indoor units 3. Therefore, the start-up time taken for switching the indoor units 3 from the cooling operations to heating operations is reduced.

When the air-conditioning apparatus 100 according to Embodiment is in the continuous heating operation and energy storing mode, cooling energy is storable in the heat medium that is stored in the heat medium energy storage tank 60 while heating operations are performed on any of the indoor units 3.

When the air-conditioning apparatus 100 according to Embodiment is in the continuous cooling operation and energy storing mode, heating energy is storable in the heat medium that is stored in the heat medium energy storage tank 60 while cooling operations are performed on any of the indoor units 3.

When the air-conditioning apparatus 100 executes the freezing easing mode in which the heat medium is made to flow through the heat medium pipes 5, freezing of the heat medium in the heat medium pipes 5 is suppressed. Thus, the time taken for executing the freezing easing mode is reduced. Even if a zeotropic refrigerant mixture is employed as the heat-source-side refrigerant, freezing of the heat medium that may occur when the intermediate heat exchangers 25*a*, 25*b* are functioning as evaporators is suppressed.

In the air-conditioning apparatus 100 according to Embodiment, the indoor units 3 are connected to the relay unit 2 by the heat medium pipes 5, instead of being connected to the outdoor unit 1 by the heat medium pipes 5. That is, since the outdoor unit 1 and the relay unit 2 are not connected to each other by the heat medium pipes, the total length of the heat medium pipes 5 is reduced. Hence, the length of transport of the heat medium, which has a relatively low transport efficiency than the heat-source-side refrigerant, is reduced. Consequently, energy is saved.

In the air-conditioning apparatus 100, the outdoor unit 1 and the relay unit 2 are connected to each other by two pipes, and the relay unit 2 and the indoor units 3 are connected to each other by two pipes times the number of indoor units 3. Since the number of pipes (refrigerant pipes 4) that connect the outdoor unit 1 and the relay unit 2 to each other and the number of pipes (heat medium pipes 5) that connect the relay unit 2 and the indoor units 3 are small, piping work is easy. That is, the installation of the air-conditioning apparatus 100 is improved.

In the air-conditioning apparatus 100, the pumps 31*a* and 31*b* that transport the heat medium are not provided for each of the indoor units 3*a* to 3*d*. That is, since the air-conditioning apparatus 100 includes two pumps, cost increase and noise are reduced.

In the air-conditioning apparatus 100, since the refrigerant pipes 4 are not provided near the indoor units 3, leakage of the heat-source-side refrigerant in or near the indoor spaces is suppressed.

The first heat medium flow switching devices 32 and the second heat medium flow switching devices 33 each only need to have switchable passages, that is, the first heat medium flow switching devices 32 and the second heat medium flow switching devices 33 may be a device, such as a three-way valve, having three switchable passages or a combination of two devices, such as on-off valves, each having two openable and closable passages. Alternatively, the first heat medium flow switching devices 32 and the second heat medium flow switching devices 33 may each be a device, such as a stepping-motor-driven mixing valve, having three passages and that is capable of changing the flow rates for the passages, a combination of two devices, such as electronic expansion valves, each having two passages and that is capable of changing the flow rates for the passages, or the like. Such a configuration prevents the occurrence of water hammer due to sudden opening or closing of the passage.

While the above description concerns an exemplary case where the heat medium flow control devices 34 are each a two-way valve, the heat medium flow control devices 34 are not limited thereto and may each be a control valve having three passages and may be connected to pipes that bypass the use-side heat exchangers 35. Furthermore, the heat medium flow control devices 34 may each be of a stepping-motor-driven type and be capable of controlling the flow rate for each passage. Specifically, the heat medium flow control devices 34 may each be a two-way valve or a three-way valve one of the three passages of which is closed. Moreover, the heat medium flow control devices 34 may each be an on-off valve or the like having two openable and closable passages, so that the flow rate is controlled to be relatively uniform by repeating on and off operations.

While the above description concerns an exemplary case where the second refrigerant flow switching devices 28 are each a four-way valve, the second refrigerant flow switching devices 28 are not limited thereto and may each be a combination of a plurality of two-way-switchable valves or three-way-switchable valves so as to allow the refrigerant to flow in the same manner as described above.

There is no problem, obviously, to provide a plurality of devices functioning as the intermediate heat exchangers 25 and the first expansion devices 26.

While the above description concerns an exemplary case where the heat medium flow control devices 34 are included in the relay unit 2, the present invention is not limited to such a case. Specifically, the heat medium flow control devices 34 may be included in the indoor units 3, or are not necessarily be included in the relay unit 2 or the indoor units 3.

While the above description concerns an exemplary case where the air-conditioning apparatus 100 includes the accumulator 19, the air-conditioning apparatus 100 does not necessarily include the accumulator 19. Moreover, while the heat-source-side heat exchanger 12 and the use-side heat exchangers 35 in general tend to be provided with air-sending devices so that condensation or evaporation is promoted by sending air, the present invention is not limited to such a case. For example, the use-side heat exchangers 35 may each be a panel heater or the like utilizing radiation, and the heat-source-side heat exchanger 12 may be a water-cooled device that transfers heat by using water or antifreeze. That is, the heat-source-side heat exchanger 12 and the use-side heat exchangers 35 may be of any type, as long as they are capable of transferring or receiving heat.

While the above description concerns an exemplary case where the use-side heat exchangers 35 and the heat medium flow control devices 34 include four use-side heat exchangers 35*a* to 35*d* and four heat medium flow control devices 34*a* to 34*d* (four pairs in total), the present invention is not limited to such a case, as long as at least one pair of a use-side heat exchanger 35 and a heat medium flow control device 34 are provided.

While the above description concerns an exemplary case where two intermediate heat exchangers 25*a* and 25*b* are provided, the present invention is not limited to such a case. Any number of intermediate heat exchangers 25 may be provided, as long as they are capable of cooling and/or heating the heat medium. Moreover, the number of pumps 31*a* and the number of pumps 31*b* are each not limited to one. A plurality of small-capacity pumps may be connected in parallel.

The heat medium may be, for example, brine (antifreeze), water, a mixture of brine and water, a mixture of water and a highly anticorrosive additive, or the like. That is, the air-conditioning apparatus 100 employing any of such substances as the heat medium contributes to an improvement in safety from the leakage of the heat medium in the indoor spaces 7.

The invention claimed is:

1. An air-conditioning apparatus comprising:
a refrigerant circuit including a compressor, a first refrigerant flow switching device, a plurality of intermediate heat exchangers, a first expansion device, and a heat-source-side heat exchanger, through all of which a refrigerant circulates and all of which in combination form a refrigeration cycle; and
a heat medium circuit including the plurality of intermediate heat exchangers, a pump, and a plurality of use-side heat exchangers, through all of which a heat medium circulates;
a controller configured to control operation of the refrigerant circuit and the heat medium circuit;
a heat medium energy storage that is connected to the heat medium circuit via a plurality of heat medium pipes and is configured to store the heat medium; and
an intra-storage heat exchanger that is connected to the refrigerant circuit and configured to heat or cool the heat medium in the heat medium energy storage using the refrigerant from the refrigerant circuit supplied to the intra-storage heat exchanger, wherein the heat medium that is heated in the heat medium energy storage and is stored with heating energy in the heat medium energy storage is transported to any of the use-side heat exchangers that have been requested to perform heating operations, or the heat medium that is cooled in the heat medium energy storage and is stored with cooling energy in the heat medium energy storage is transported to any of the use-side heat exchangers that have been requested to perform cooling operations, wherein the controller is configured to control the operation of the refrigerant circuit and the heat medium circuit, while the heat medium is stored with thermal energy in the heat medium energy storage, to cause the refrigerant to circulate through the refrigerant circuit via the intra-storage heat exchanger without passing through the plurality of intermediate heat exchangers, and to cause the heat medium to circulate through the heat medium circuit via the heat medium energy storage, wherein the plurality of intermediate heat exchangers exchange heat between the refrigerant which is supplied through the refrigerant circuit and the heat medium that is supplied through the heat medium circuit, wherein the intra-storage heat exchanger exchanges heat between the refrigerant which is supplied through the refrigerant circuit and the heat medium in the heat medium energy storage tank, wherein the intra-storage heat exchanger is a single heat exchanger provided in the heat medium energy storage, and wherein the heat medium energy storage is a single tank.

2. The air-conditioning apparatus of claim 1, wherein, the controller is configured to control the operation of the refrigerant circuit and the heat medium circuit, when the use-side heat exchangers starts to operate, to transport the heat medium that is stored with heating energy or cooling energy to any of the use-side heat exchangers that have been requested to perform the heating operations or the cooling operations.

3. The air-conditioning apparatus of claim 1, wherein the controller is configured to perform a storing with heating energy while the use-side heat exchangers are performing the cooling operations or when the heat medium is not supplied to the use-side heat exchangers, and to perform a storing with cooling energy while the use-side heat exchangers are performing the heating operations or when the heat medium is not supplied to the use-side heat exchangers.

4. The air-conditioning apparatus of claim 1, further comprising:
an outdoor unit including the compressor, the first refrigerant flow switching device, and the heat-source-side heat exchanger;
a relay unit including the plurality of intermediate heat exchangers, a second refrigerant flow switching device, the first expansion device, and the pump;
indoor units including the plurality of use-side heat exchangers; and
a heat medium energy storage device including the heat medium energy storage and the intra-storage heat exchanger.

5. The air-conditioning apparatus of claim 4,
wherein the heat medium energy storage device includes
a third refrigerant flow switching device configured to switch between a state where the refrigerant is allowed to flow into the intra-storage heat exchanger and a state where the refrigerant is allowed to flow out of the intra-storage heat exchanger;
a second expansion device configured to expand the refrigerant that flows out of the intra-storage heat exchanger or the refrigerant that flows into the intra-storage heat exchanger; and
a heat medium passage opening and closing device configured to open and close a passage between the heat medium circuit and the heat medium energy storage.

6. The air-conditioning apparatus of claim 1, wherein the heat medium energy storage that is connected to the heat medium circuit switches between storing the heat medium that is stored with heating energy, and storing the heat medium that is stored with cooling energy.

7. An air-conditioning apparatus comprising:
a refrigerant circuit including a compressor, a first refrigerant flow switching device connected to the compressor, a plurality of intermediate heat exchangers, second refrigerant flow switching devices each connected to the plurality of intermediate heat exchangers, a first expansion device, and a heat-source-side heat exchanger, through all of which a refrigerant circulates and all of which in combination form a refrigeration cycle; and
a heat medium circuit including the plurality of intermediate heat exchangers, a pump, and a plurality of use-side heat exchangers, through all of which a heat medium circulates,
wherein the air-conditioning apparatus further comprises
a heat medium energy storage that is connected to the heat medium circuit and configured to store the heat medium;
an intra-storage heat exchanger that is connected to the refrigerant circuit and configured to heat or cool the heat medium in the heat medium energy storage by using the refrigerant supplied from the refrigerant circuit;
a third refrigerant flow switching device connected to one end of the intra-storage heat exchanger and configured to be switched depending on heating or cooling the heat medium in the heat medium energy storage; and
a second expansion device connected to the other end of the intra-storage heat exchanger and configured to expand the refrigerant that flows out of the intra-storage heat exchanger or the refrigerant that flows into the intra-storage heat exchanger,
wherein the heat medium that is heated in the heat medium energy storage and is stored with heating energy in the heat medium energy storage is transported to any of the use-side heat exchangers that have been requested to perform heating operations, or
the heat medium that is cooled in the heat medium energy storage and is stored with cooling energy in the heat medium energy storage is transported to any of the use-side heat exchangers that have been requested to perform cooling operations.

8. The air-conditioning apparatus of claim 7, further comprising
a controller configured to control operation of the refrigerant circuit and the heat medium circuit to cause, while the heat medium is stored with thermal energy in the heat medium energy storage, the heat medium to circulate through the heat medium circuit via the heat medium energy storage.

9. The air-conditioning apparatus of claim 7, further comprising:
an outdoor unit including the compressor, the first refrigerant flow switching device, and the heat-source-side heat exchanger;
a relay unit including the plurality of intermediate heat exchangers, the second refrigerant flow switching device, the first expansion device, and the pump;
indoor units including the plurality of use-side heat exchangers; and
a heat medium energy storage device including the heat medium energy storage and the intra-storage heat exchanger.

10. The air-conditioning apparatus of claim 9, wherein the heat medium energy storage device includes:
the third refrigerant flow switching device;
the second expansion device; and
a heat medium passage opening and closing device configured to open and close a passage between the heat medium circuit and the heat medium energy storage.

* * * * *